(12) United States Patent
Babokhov et al.

(10) Patent No.: US 12,032,890 B2
(45) Date of Patent: Jul. 9, 2024

(54) MECHANISM TO PLACE REPEATERS ON EXISTING STRUCTURED ROUTING BASED ON GEOMETRIC CONSIDERATION AND TO PLACE LATTICE MULTI-LAYER METAL STRUCTURES OVER CELLS

(71) Applicant: Intel Corporation, Santa Clara, CA (US)

(72) Inventors: Sergei Babokhov, Acton, MA (US); Charles Magnuson, Sutton, MA (US)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 16/928,975

(22) Filed: Jul. 14, 2020

(65) Prior Publication Data

US 2021/0192115 A1  Jun. 24, 2021

Related U.S. Application Data

(60) Provisional application No. 62/982,007, filed on Feb. 26, 2020, provisional application No. 62/950,867, filed on Dec. 19, 2019.

(51) Int. Cl.
| | |
|---|---|
| *G06F 30/30* | (2020.01) |
| *G06F 30/392* | (2020.01) |
| *G06F 30/394* | (2020.01) |
| *G06F 30/398* | (2020.01) |
| *G06F 3/04847* | (2022.01) |
| *G06F 117/10* | (2020.01) |

(52) U.S. Cl.
CPC .......... *G06F 30/392* (2020.01); *G06F 30/394* (2020.01); *G06F 30/398* (2020.01); *G06F 3/04847* (2013.01); *G06F 2117/10* (2020.01)

(58) Field of Classification Search
CPC .... G06F 30/392; G06F 30/394; G06F 30/398; G06F 3/04847; G06F 2117/10
See application file for complete search history.

(56) References Cited

U.S. PATENT DOCUMENTS 5,691,662 A * 11/1997 Soboleski ............. G06F 30/394
327/564
5,838,580 A * 11/1998 Srivatsa .................. G06F 30/39
716/134

(Continued)

*Primary Examiner* — Jack Chiang
*Assistant Examiner* — Brandon Bowers
(74) *Attorney, Agent, or Firm* — Schwabe, Williamson & Wyatt, P.C.

(57) ABSTRACT

A method to place repeaters on existing structured routes based on user specified locations. Location can be specified in multiple ways. For example, a set of fixed repeating distances (starting from a driver), number of repeaters (spread evenly on net routing), an absolute cutline dissecting the existing nets routing (e.g., x or y coordinate measure from the origin of the cell), relative cutline dissecting the existing nets routing (e.g., x or y coordinate measured from the origin of the nets bounding box), etc. can specify location. A repeater legalization procedure allows a user to arrange repeaters in various forms thus legalizing them to meet specific design requirements. A preview mode is provided where results are presented in the form of annotations (e.g., cartoon drawings) displayed on a canvas (e.g., display screen) rather than in the form of real layout objects in a database.

26 Claims, 24 Drawing Sheets

(56) References Cited

U.S. PATENT DOCUMENTS

| | | | | |
|---|---|---|---|---|
| 6,477,690 B1* | 11/2002 | Witte | ............... | G06F 30/394 |
| | | | | 716/134 |
| 6,532,580 B1* | 3/2003 | Josephson | ............ | G06F 30/394 |
| | | | | 716/122 |
| 2002/0087940 A1* | 7/2002 | Greidinger | ........... | G06F 30/394 |
| | | | | 716/108 |
| 2018/0025107 A1* | 1/2018 | Bois | ............... | G06F 30/398 |
| | | | | 716/112 |

* cited by examiner

MECHANISM TO PLACE REPEATERS ON EXISTING STRUCTURED ROUTING BASED ON GEOMETRIC CONSIDERATION AND TO PLACE LATTICE MULTI-LAYER METAL STRUCTURES OVER CELLS

CLAIM OF PRIORITY

This application claims priority of U.S. Provisional Patent Application No. 62/950,867 titled "MECHANISM TO PLACE REPEATERS ON EXISTING STRUCTURED ROUTING BASED ON GEOMETRIC CONSIDERATION," filed Dec. 19, 2019. This application also claims priority of U.S. Provisional Patent Application No. 62/982,007 titled "A MECHANISM TO PLACE LATTICE STYLE MULTI-LAYER METAL STRUCTURES OVER CELLS," filed Feb. 26, 2020. Both applications are incorporated by reference in their entirety.

BACKGROUND

To insert repeaters on structured routing, fully automated solutions are often used but require many iterations to meet timing needs but may not necessarily satisfy other design quality requirements that need to be met. During the iterative process, structured routing is affected, and existing routing topologies are not guaranteed to be exactly as they were originally designed, and, in the end, it is hard to reproduce a satisfactory result. In addition to all these shortcomings, the process is extremely time consuming and error prone.

In the case of high-speed interconnect, routing includes hundreds of thousands of nets and or busses created in a structured style following predefined topologies. It is imperative to preserve these topologies and place repeaters prearranged and legalized such that the routing is DRC (design-rule-check) clean, meets timing, area and IR/EM (electro-migration) targets with guaranteed reproducibility of the results.

High-speed system-on-chips (SoCs) are designed to meet stringent power, area and timing requirements. Routing of signals that are identified as timing critical are planned and implemented early and prudently. To meet timing targets of high-speed signals, large repeater cells are inserted on the routing of these nets.

Reliability (RV) of the physical design is an important factor to ensure SoCs nominal performance over the lifetime of the product. The robustness of the connection from the output of a repeater cell up to the routing of a timing critical signal is an important contributor to RV.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
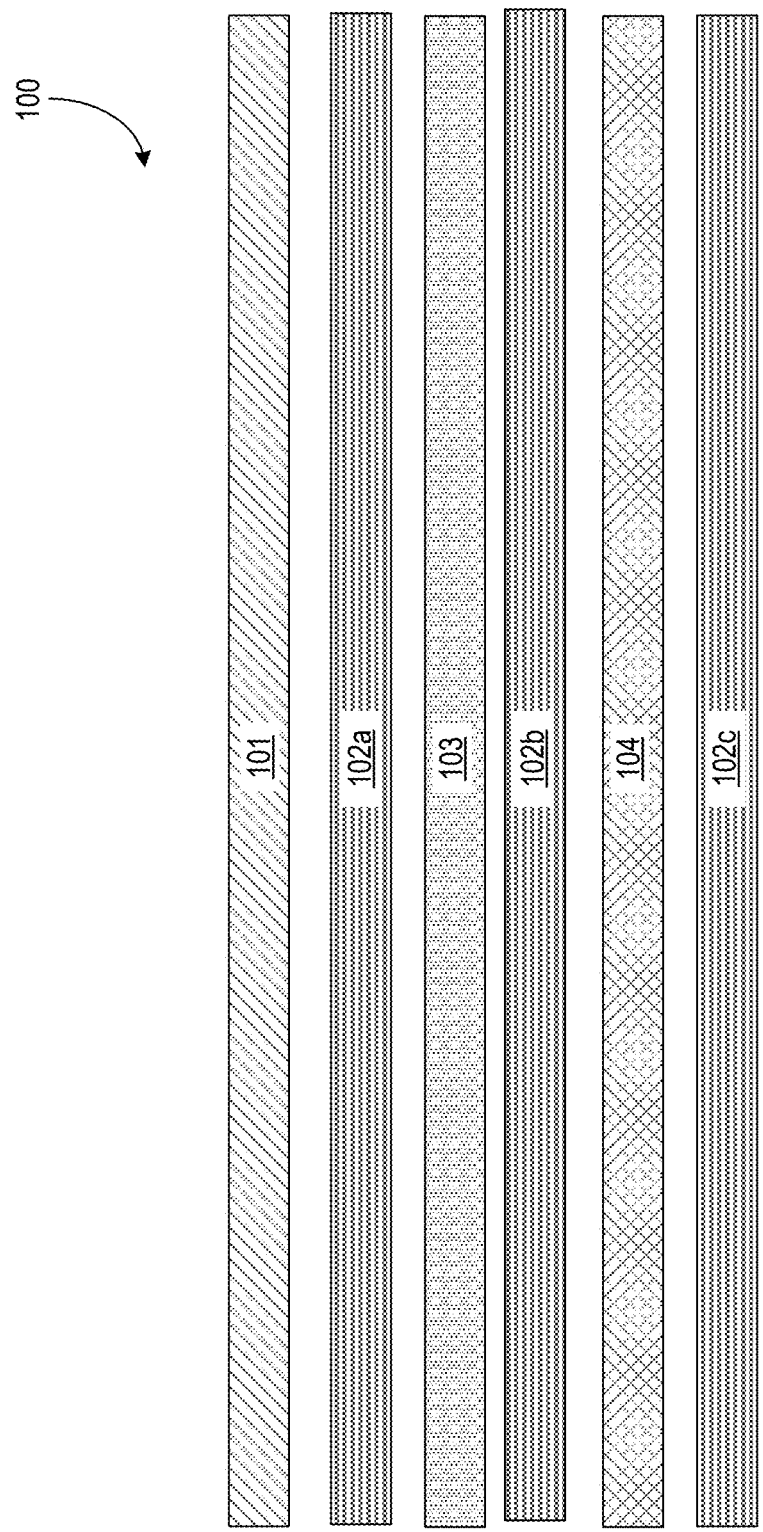
FIG. 1 illustrates structured net routes slated for repeater insertion.

Traditional methods of inserting buffers and inverters on existing routing are usually fully automated and based on timing driven algorithms. When these methods are applied to a structured routing, the results of repeater placement are not guaranteed to be structured, reproducible and meeting IR/EM targets thus making it problematic to deliver desired quality for high speed interconnect. Here, structured routes are defined as segments of routes that follow a same topology. For example, straight routs, L-shaped routes, etc. are structured segments. Several iterations are required to achieve a desired solution meeting minimum requirement in a timely manner. The drawback to several iterations is the unpredictable and un-repeatable results.

Some embodiments describe a method to place repeaters on existing structured routes based on user specified locations. At this point, the repeaters might overlap one another and/or occupy illegal row sites. Here, illegal row sites are positions in layout that are not guaranteed to satisfy DRC rules. Location can be specified in multiple ways. For example, a set of fixed repeating distances (starting from a driver), number of repeaters (spread evenly on net routing), an absolute cutline dissecting the existing nets routing (e.g., x or y coordinate measure from the origin of the cell), relative cutline dissecting the existing nets routing (e.g., x or y coordinate measured from the origin of the nets bounding box), etc. can specify location. In various embodiments, a repeater legalization procedure is described that allows a user to arrange repeaters in various forms thus legalizing them to meet specific design requirements. In some embodiments, a preview mode is provided where results are presented in the form of annotations (e.g., cartoon drawings) displayed on a canvas (e.g., display screen) rather than in the form of real layout objects in a database.

Some embodiments provide machine-readable storage media having machine-readable instructions that, when executed, cause one or more machines to perform a method comprising identifying routes of structured nets based on user inputs and segmenting the structured nets to generate a multiple of segmented structured nets. The method further comprises retracting the multiple of segmented structured nets around a boundary of a target cell and renaming the retracted multiple of segmented structured nets. The method comprises placing or legalizing target cells in between the multiple of segmented structured nets. In some embodiments, the user inputs include: a list of net names, a list of collection of nets, busses, and bundles. In some embodiments, the target cells include repeaters or any other cell.

In some embodiments, the target cells are legalized according to a user provided criteria including one or more of: route-ability from existing routes down to pins of the target cell; elimination of hot spots due to multiple large target cells next to each other; minimization of area occupied by the target cells; available routing resources; or electro migration consideration. In some embodiments, the placing the target cells comprises one or more of: placing the target cells in a diagonal fashion; placing target cells in a matrix configuration; placing target cells vertically; placing target cells horizontally; or placing target cells randomly. In some embodiments, the method comprises displaying, in a preview mode, placement of repeaters in a layout. In some embodiments, the method comprises saving in memory a command or series of commands that produced placement of target cells in accordance with the user provided criteria, wherein the command or series of commands are saved into a recipe file to be re-executed later to reproduce the placement of target cells for a SoC derivative or a scaled process.

There are many technical effects of the various embodiments. For example, the approach of various embodiments represents user driven automation that enables designers to deliver exceptional quality layout for high-speed highly constrained designs. The methodology of placing repeaters enables quicker design iterations and deterministic outcome resulting in higher design quality and quicker turnaround time. Various embodiments enable the ability to capture design intent in the form of a recipe of commands to be leveraged for derivatives or process migration thus shortening SoC (system-on-chip) design cycles. Other technical effects will be evident from the various figures and embodiments.

Routing of critical signals is often implemented using the highest, less resistive metal layers. To efficiently make the connection down to the repeater cells associated with those signals, multi-layer metal straps organized in a lattice style structure should be placed in between signal routes and on top of the driver cells. These structures are usually referred to as via-ladders or ladders. Ladders ensure that the routing downgrade from the less resistive upper layers down to the more resistive cell pins on lower layers have both low resistance and ensures that the current flows out of the repeater cells both evenly and rapidly.

Existing solutions for ladder placement are mainly applicable to a fully automated multi-iteration optimization design style, which may be appropriate for an ASIC-style design (Application Specific Integrated Circuit style design) that can be completed with few iterations. However, in such existing solutions, a user has little to no control over the placement of the ladder and the ladder definition being used. Existing solutions are hardly practical when designing more complex, high-speed SoCs, which involve many design iterations early in the design cycle and require user knowledge to come up with feasible floorplans before attempting to complete the design. As such, existing approaches are too slow and overweight as they invoke a complete routing engine to yield sign-off quality results. Existing solutions are mostly applicable for sign off step of the design and cannot effectively be applied to an iterative approach.

Some embodiments describe a mechanism to place lattice style multi-layer metal structures over cells (e.g., circuitry cells such as repeaters, inverters, flip-flops, and/or any library cell or intellectual property (IP) block). So as not to obscure the various embodiments, the cells are described with reference to repeaters, but the embodiments are applicable to any type of intellectual property block or cell. In some embodiments, the mechanism performs repeater placement pattern recognition. In this process, repeaters with certain common properties (e.g., footprint, layout, drive strength, number of input pins, number of output pins, etc.) are identified and collected in a particular bucket or group in memory for further processing. For example, similar repeater cells are assigned to a bucket with unique templates of repeater placement relative to reference signal lines and obstructions. Examples, of reference signal lines and/or obstructions include power grid, ground grid, or any other reference signal line such as bias lines, I/O lines, etc. that are passing over the repeater cell.

In various embodiments, for each unique placement template, a ladder template is created. Metal straps or lines (or layers) that comprise the ladder are generated on predefined, correct-by-construction metal layer tracks resulting in little to no DRC (design rule checking) to create clean ladders. After that, the shapes of the template are stamped or instantiated into ladder structures over each cell in the bucket. The stamping of the straps is extremely quick as DRC checking is unnecessary because it was done already during ladder template generation once per placement bucket.

There are many technical effects of the various embodiments. For example, the ladder generation mechanism is very fast and deterministic because of a finite number of repeater placement templates (e.g., low 100s) and use of correct-by-construction metal track patterns. In the approach of various embodiments, the ladder definition is not separate from the ladder creation command; it is provided to the command as one of its options by either passing a number of straps per layer/width or by passing a resistance value to be met. This combines both specification and execution in a single form enabling intent driven approach and makes construction process maintenance easy. The ladder definition may not be specified in terms of the number of vias, rather it is described in a form of the number of metal straps per layer and width, for example. This yields a shorter, more intuitive and independent definition of a ladder for numerous variants of multi-pin finger repeater structures. Thus, the mechanism of various embodiments enables easier maintenance quicker design iterations and deterministic outcome resulting in higher design quality and quicker turnaround time. The mechanism of various embodiments enables the ability to capture design intent in the form of a recipe of commands to be leveraged for derivatives or process migration thus shortening SoC design cycles. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front." "back," "top." "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates structured net routes 100 slated for repeater insertion. Here, structured routes are defined as segments of routes that follow the same topology. These segments of routes are 101, 102a, 102b, 103c, 103, and 104. The different patterns for the routes may indicate different signals on those routes. However, the segment routes can carry the same signal. The method of some embodiments uses computer automated procedures for placing repeaters on existing structured net routes based on user input passed through various options and parameters (user assisted automation). The net routing is selected from the design based on a user input in the form of a list of net names or a collection of nets, and/or busses or bundles. An example, various options and parameters are presented herein:

```
cr_place_repeaters  # Creates repeaters on structured routes
    -nets           (nets, collection of nets, busses to drop repeaters)
    [-layer ]       (consider these layers only when place repeaters)
    [-repeater_name ]   (ref name of repeater cell)
    [-repeater_suffix ]   (suffix to put on repeater cell and repeated nets)
    [-repeater_number ]   (how many repeaters to place on path)
    [-repeater_arrangement]   (How to place repeaters, checkerboard,
        diagonal, horizontal, vertical)
    [-repeater_distance ] (the distance to insert repeaters: insert a
repeater every micron value specified)
```

```
                [-repeater_cutlines ] (list of cut-lines to calculate exact locations
{X Y} (cutline intersection with trunk) to drop repeaters )
                [-repeater_relative_cutlines ]
                        (list of relative cutlines to insert repeaters. Coordinates are
relative to nets bounding box's origin)
                [-layer_weight ]   (when -repeater_distance is specified define
weight per layer to be applied to the distance value)
                [-repeater_type ]   (type of repeater:buffer (bfr) or inverter pair (inv))
                [append_suffix ]   (appends a unique suffix to the post-repeater nets
in addition to the auto-generated suffix)
                [-stagger_mult ]   (spread repeaters by (repeater_width/height * mult)
when staggering or checker-boarding placed repeaters)
                [-do_not_stagger]   (do not stagger or checkerboard placed repeaters)
                [-remove]      (remove all repeaters on the net, reconnect net to the
original state)
                [-preview]     (do not create shapes, just annotate)
```

Figure 2:
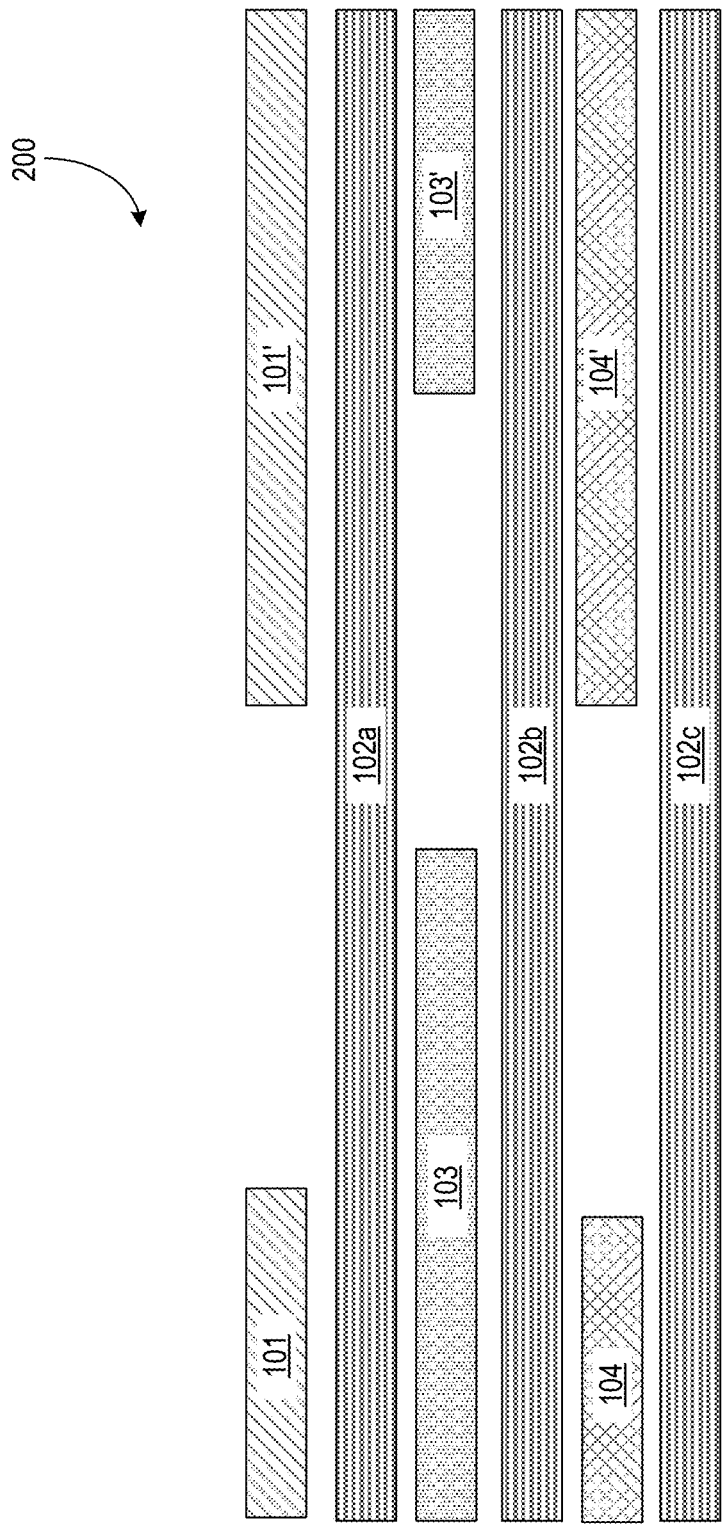
FIG. 2 illustrates wires cut around future repeater cells, in accordance with some embodiments.
Figure 3A:
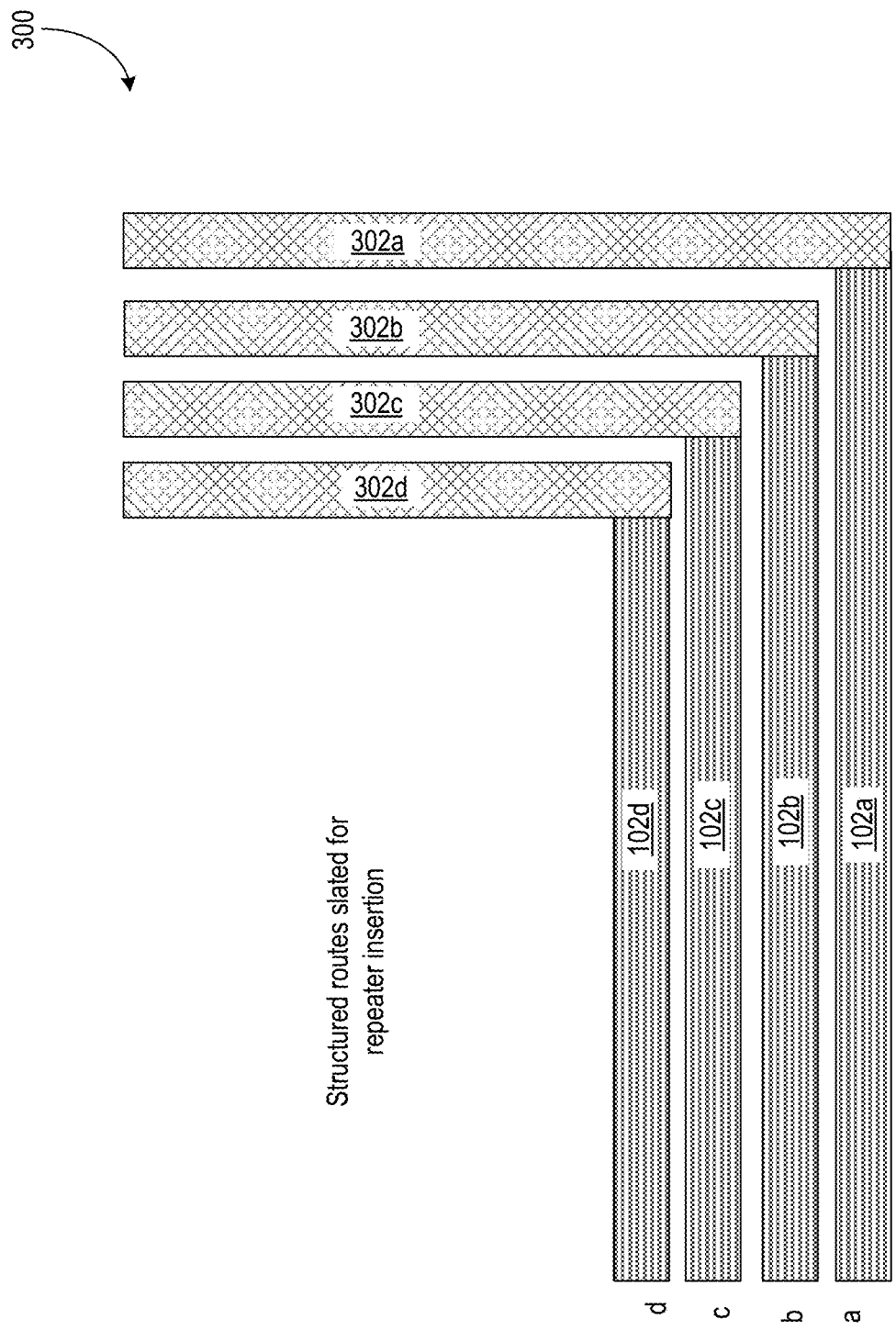
FIGS. 3A-G illustrate the process of inserting repeater cells using cut lines, in accordance with some embodiments.
Figure 3B:
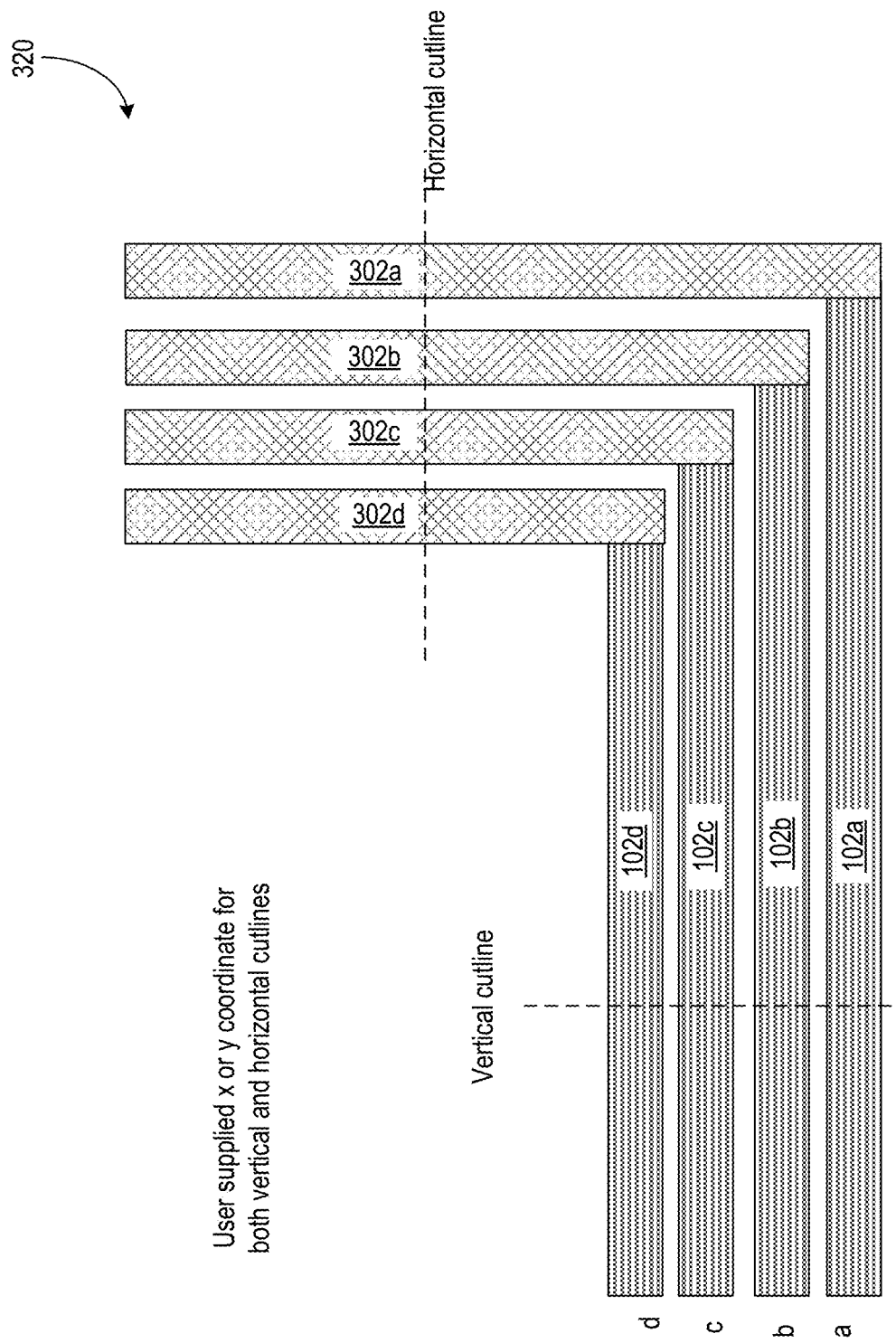
Figure 3C:
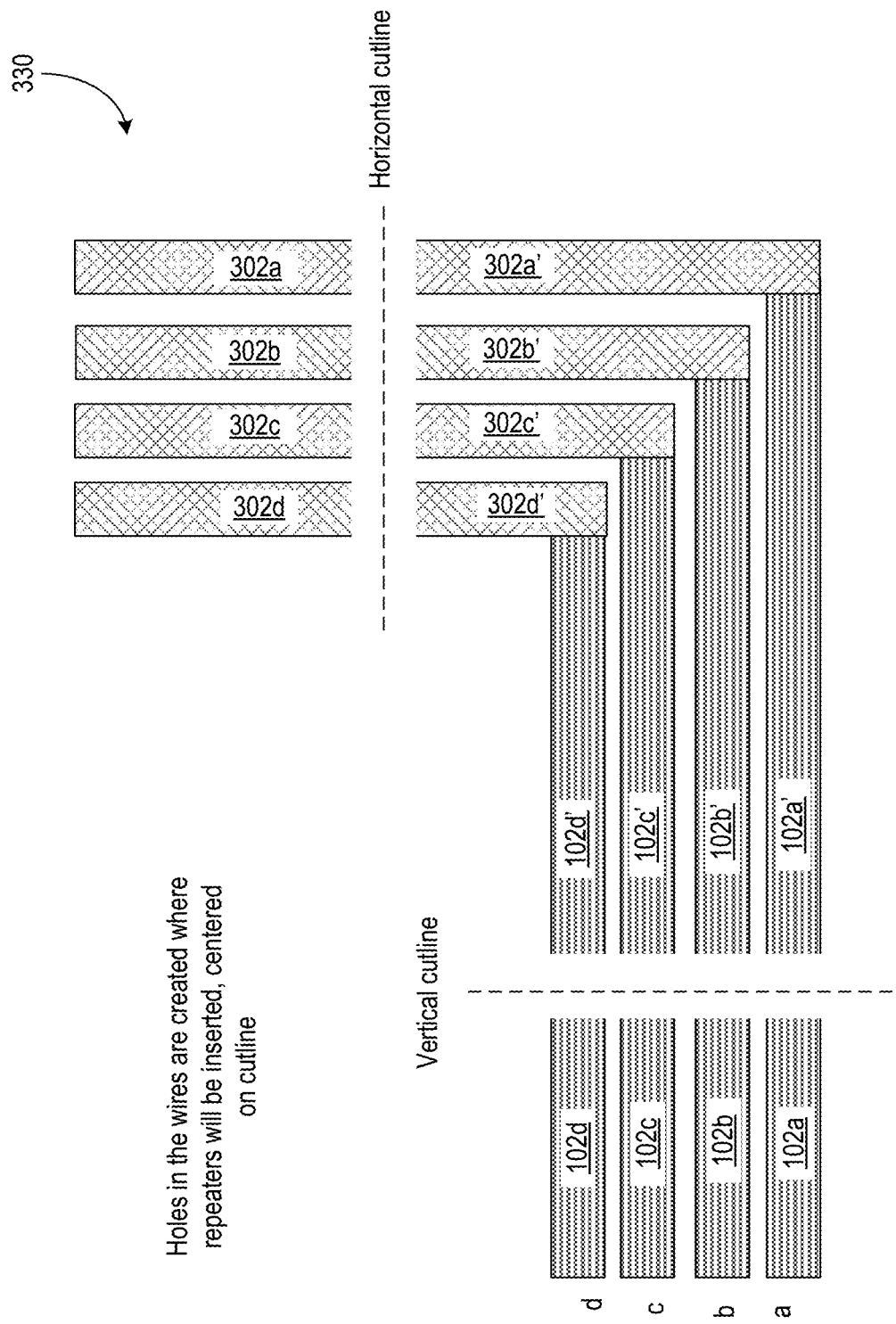
Figure 3D:
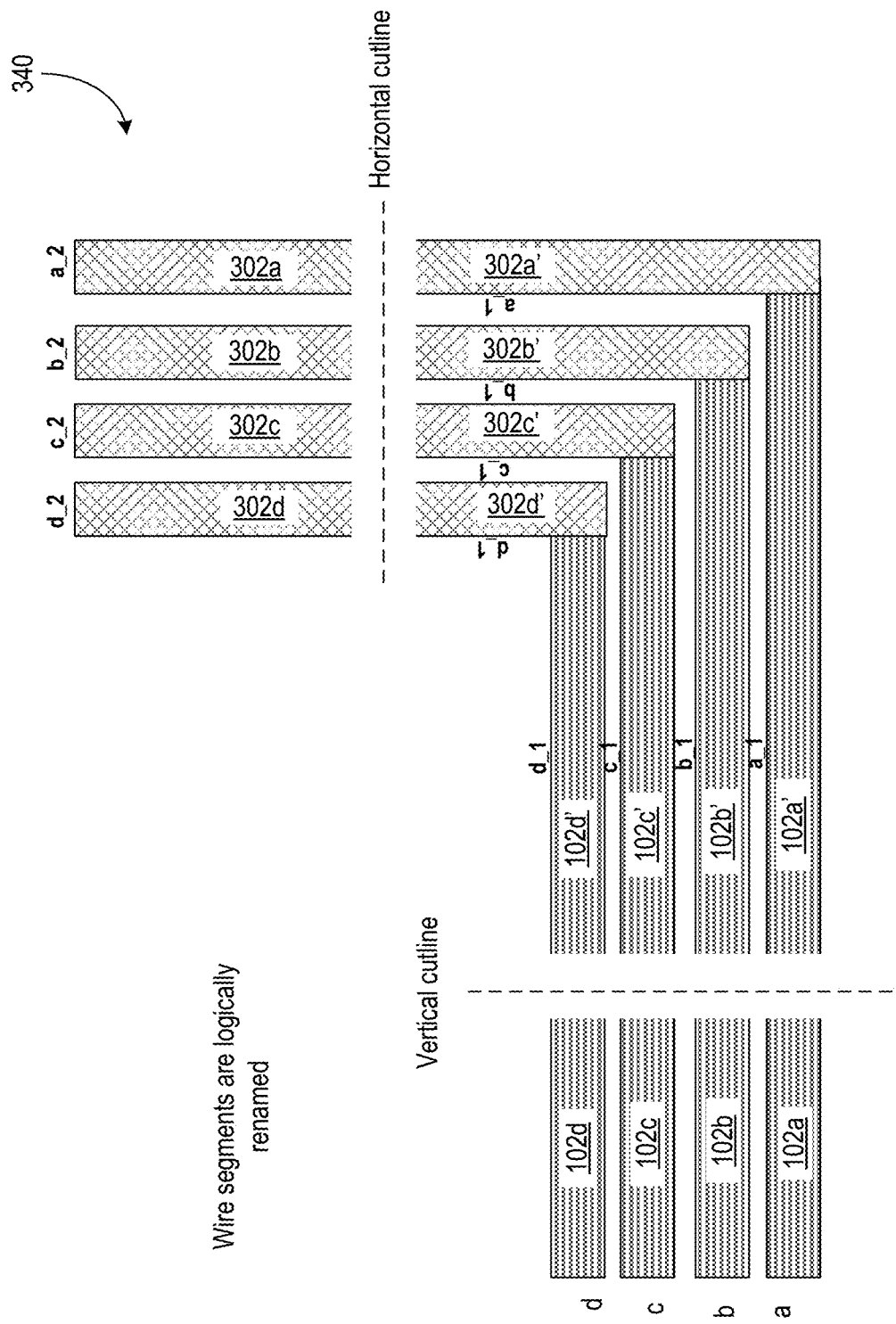
Figure 3E:
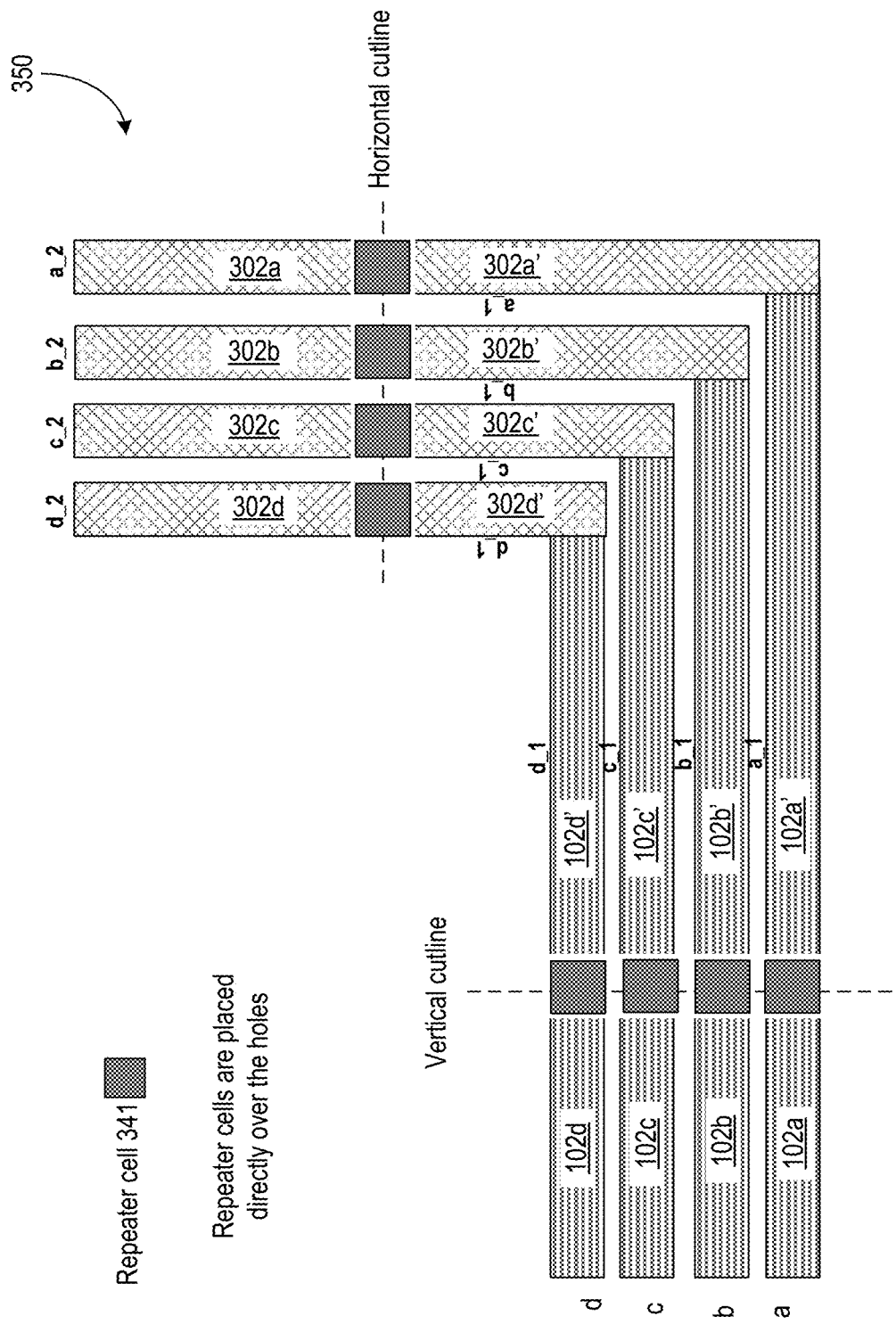
Figure 3F:
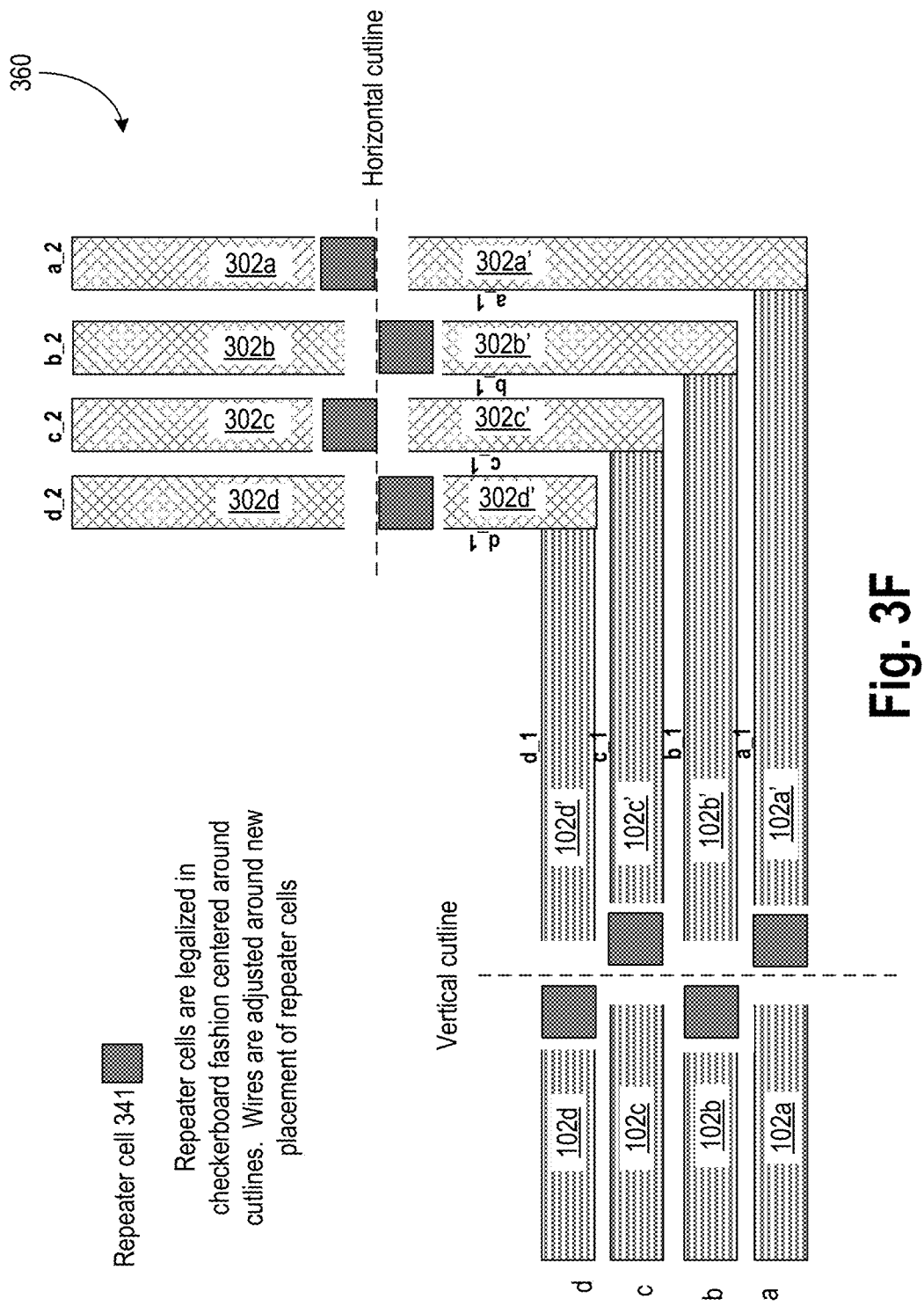
Figure 3G:
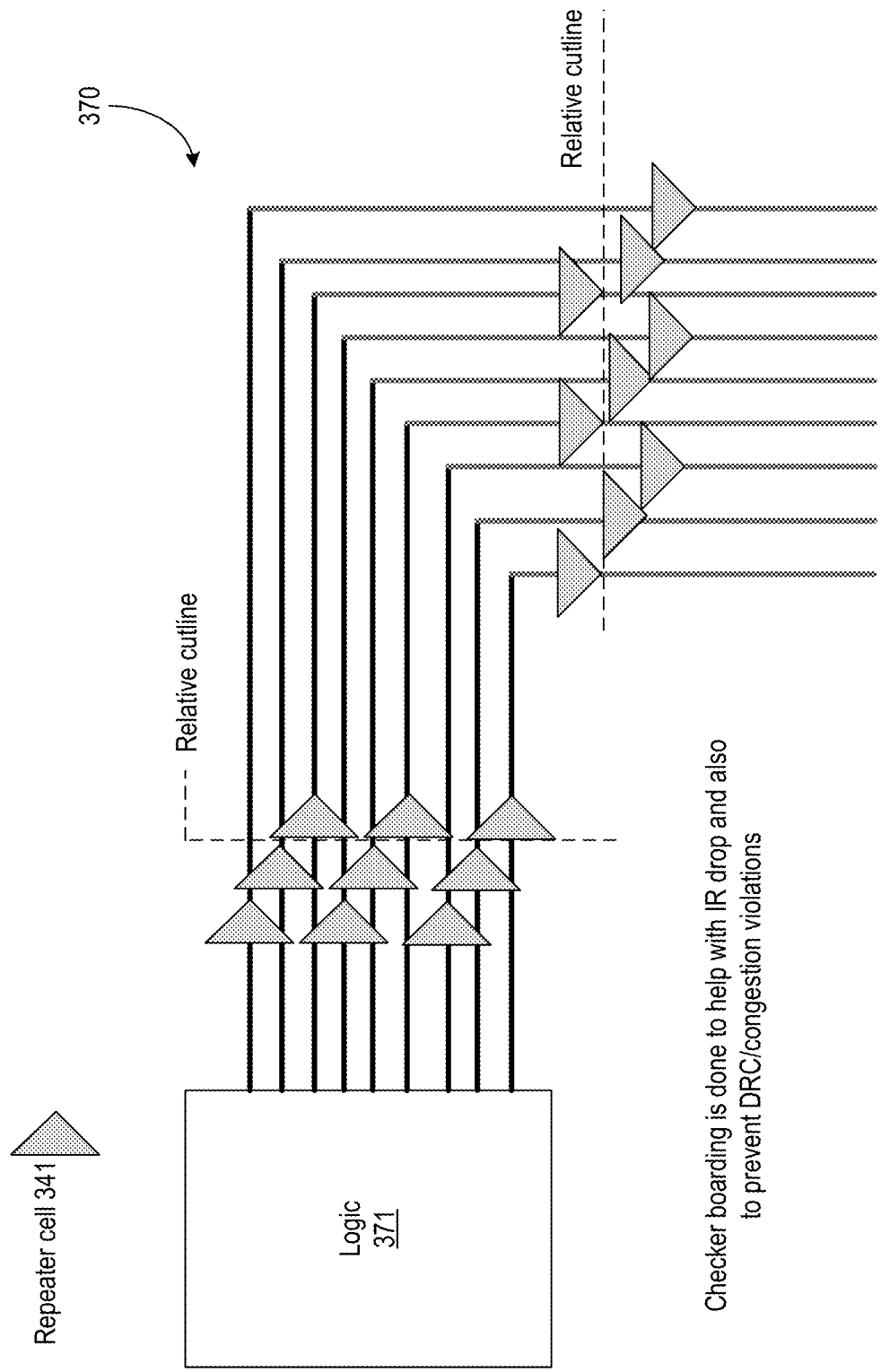

FIG. 2 illustrates a routing layout snapshot 200 showing wires cut around future repeater cells, in accordance with some embodiments. The wires of routes are cut (or segmented) in user specified locations resulting in multiple segments around the holes where repeaters are placed. The repeater cell name is passed by the user as an option. The segmented wires are then pulled back around the boundary of the repeater cell. After pullback, the nets on segmented wires are renamed to preserve logical connectivity. The pullback size is derived from the size of the repeater cell. For example, pullback size is derived from the size of the repeater cell plus a half of the width of the cell allowing extra room for tail routing down to pins. The larger the repeater cell, the larger the pullback size.

FIGS. 3A-G illustrate snapshots of processes 300, 320, 330, 340, 350, 360, and 370, respectively, of inserting repeater cells using cut lines, in accordance with some embodiments. Snapshot 300 illustrates an L-shaped set of routings that are slated for repeater insertion. The horizontal segments are 102a, 102b, 102c, and 102d, and corresponding vertical segments are 302a, 302b, 302c, and 302d, respectively. The locations for placement of repeaters are automatically derived from values of the user specified options. Examples of user options for locations are; a repeating distance (e.g., starting from a driving pin), number of repeaters (e.g., spread evenly on net routing), a cutline (e.g., an imaginary horizontal or vertical line that crosscuts wires of the routes), etc. A cutline can be passed in absolute coordinates (e.g., relative to the origin of the block) or in relative coordinates (e.g., measured relative to the bounding box of the nets passed). Here, in snapshot 320, two cutlines are shown—vertical cutline and horizontal cutline. A user may provide the x and y coordinates for both vertical and horizontal cutlines. One purpose of the cutline is to define a location of a repeater in a bus or set of parallel routes instead of specifying a location for each bit of the bus or each net in a parallel set of wires. Cutline provides an efficient way of specifying locations instead of relying on only absolute distances from a point to the repeater location. An advantage of a relative cutline is to preserve repeater locations in the case when the net's pin locations change.

Snapshot 330 illustrates holes or voids in the wires or route segments for future placement of repeaters. The holes or voids are formed along the defined cutlines (e.g., horizontal and/or vertical cutlines). The segments after holes are formed are identified with unique names (e.g., 102a, 102a'; 102b, 102b'; 102c, 102c'; 102d, 102d'; 302a, 302a'; 302b, 302b'; 302c, 302c'; and 302d, 302d'). In some embodiments, the wire segments are logically renamed (e.g., a_1, b_1, c_1, and d_1) as illustrated in snapshot 340. Snapshot 350 illustrates placement of repeaters 341 directly over the holes. Snapshot 360 illustrates legalizing the repeater cells 341 in a checker board fashion centered around the cutlines (e.g., horizontal and vertical cutlines). In this embodiment, the wire segments are adjusted around new placement of repeater cells 341. Snapshot 370 shows another view of checker boarded repeater cells. Logic 371 drives signals on the wires that are checker boarded. Checker boarding is performed to assist with IR drop and/or to prevent DRC (and/or congestion) violations.

Figure 4:
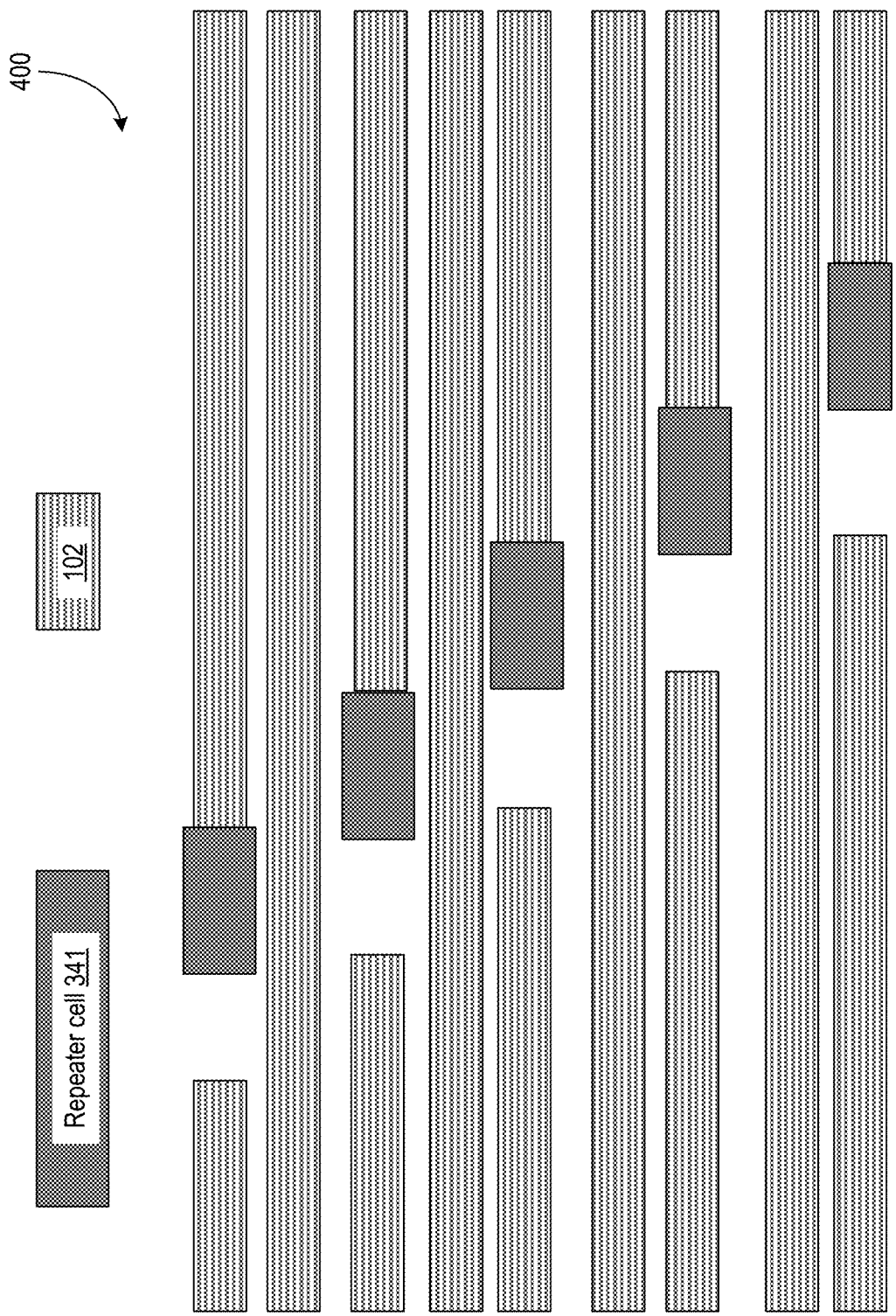
FIG. 4 illustrates repeater cells placed and legalized in a diagonal fashion, in accordance with some embodiments.

FIG. 4 illustrates a layout snapshot 400 showing repeater cells 341 placed and legalized in a diagonal fashion, in accordance with some embodiments. In some embodiments, repeaters 341 are placed in the design, and a custom legalization procedure is invoked to arrange repeaters in an organized way. One way to legalize the arrangement of repeaters is by checker boarding and making sure repeater cells and the route cuts stay as close together as possible. Checker boarding is performed by making sure no two repeaters abut one another. In some embodiments, the repeaters are also placed as close to the original location as defined by the cutline thus minimizing any scenic tail routing. Here, tail routing is generally defined as routing from the structured routes down to the pins of the repeater cells. The routing should be minimal to avoid adding an extra delay, for example. Scenic tail routing may have unnecessary jogs and extra metal. The organized placement arrangement can be different based on multiple concurrent criteria. Some examples of criteria are, route-ability from the existing routes down to pins of repeater cells (e.g., tail routing), elimination of hot spots due to multiple large repeaters next to each other, minimization of area occupied by the repeaters, placement for optimizing the available routing resources, RV/EM/timing considerations to enable efficient via ladders on top of repeaters.

Figure 5:
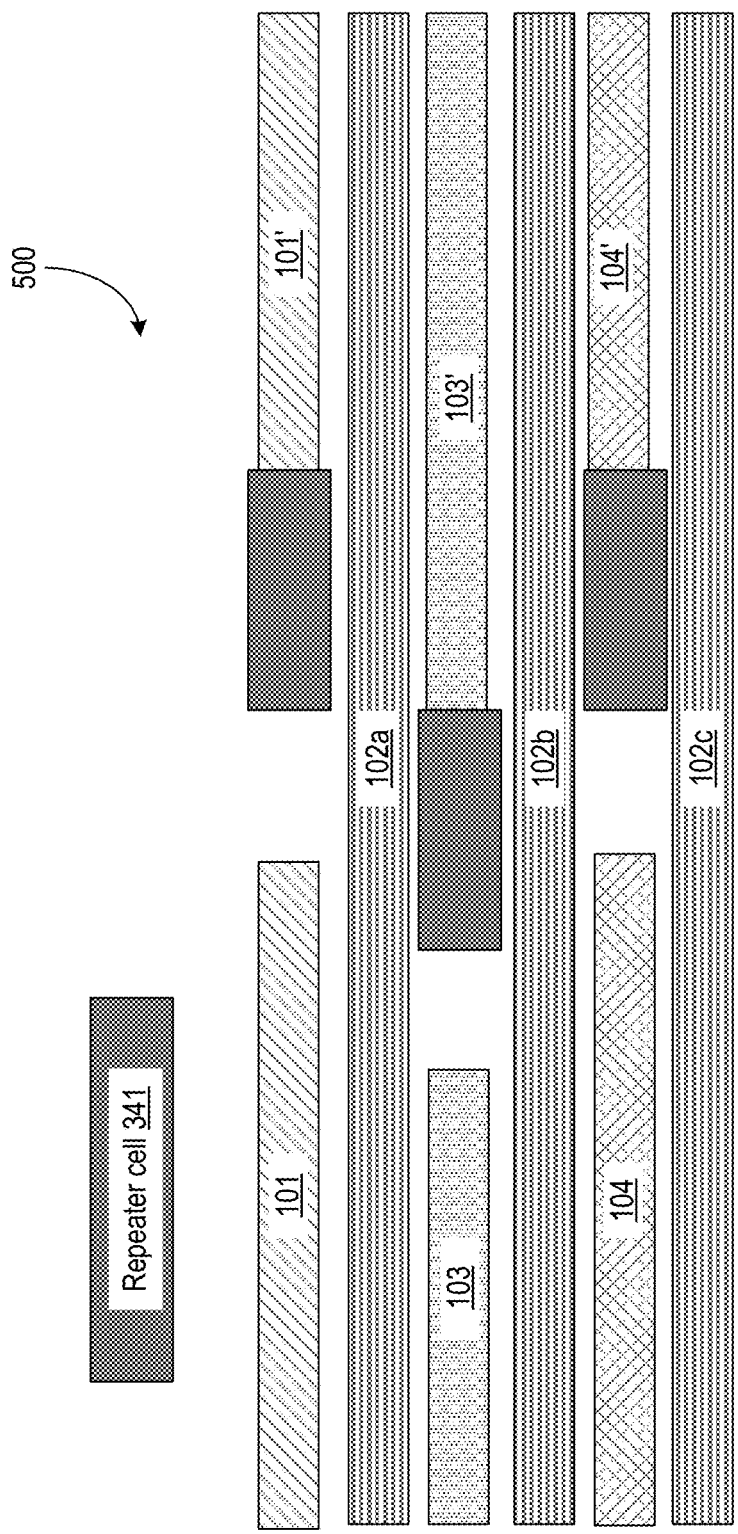
FIG. 5 illustrates repeater cells placed and legalized in a checker boarding fashion, in accordance with some embodiments.

FIG. 5 illustrates a layout snapshot 500 of repeater cells 341 placed and legalized in a checkerboard fashion, in accordance with some embodiments. Here, repeater cells 341 are placed in holes or voids formed along the wire routes discussed with reference to FIG. 2. When a hole is formed in the wire, a "'" is added to the wire label. For instance, wire 101 is split into wire segments 101 and 101', wire 103 is split into wire segments 103 and 103', and wire 104 is split into wire segments 104 and 104'/ Examples of repeater arrangements include but are not limited to; repeater staggering diagonally, repeaters placed within a matrix (e.g., checker boarded with gaps or filled with no gaps), placed in vertically/horizontally spaced array pattern, or placed completely random within an area. The arrangement of the repeaters is determined by the option to the command In this example, the wire segments of FIG. 2 are used for repeater insertion.

The method of various embodiments provides a preview mode when the command does not create real layout objects in the database but rather creates annotations (cartoon drawings) displayed on the canvas. The previews (e.g., annotations) are virtual layout objects, not persistent, and exist merely during the interactive session. Once the session ends, the previews can be destroyed. The previews give users the exact depiction of how the layout will be produced without the need of modifying the database.

With the preview approach, a user is free to try multiple attempts without spending the time and effort rolling back to the original state. This mode is extremely fast giving the user the ability to perform multiple what-if analysis thus enabling efficient iterations to get to a result quicker. Once the user achieves the desired result, it can be committed to layout by running same command without the preview mode. Additionally, the user can save the command with values of options in a file such that layout can be reproduced anytime later by executing the command.

While the various embodiments are described with reference to placing repeaters in a structured set of nets, the embodiments are not limited to repeaters. Any logic gate such as inverters, pass-gates, NAND gates, NOR gates, sequential cells (e.g., latches, flip-flops, flip-flop repeaters) or custom gates can be placed in accordance with various embodiments.

Figure 6:
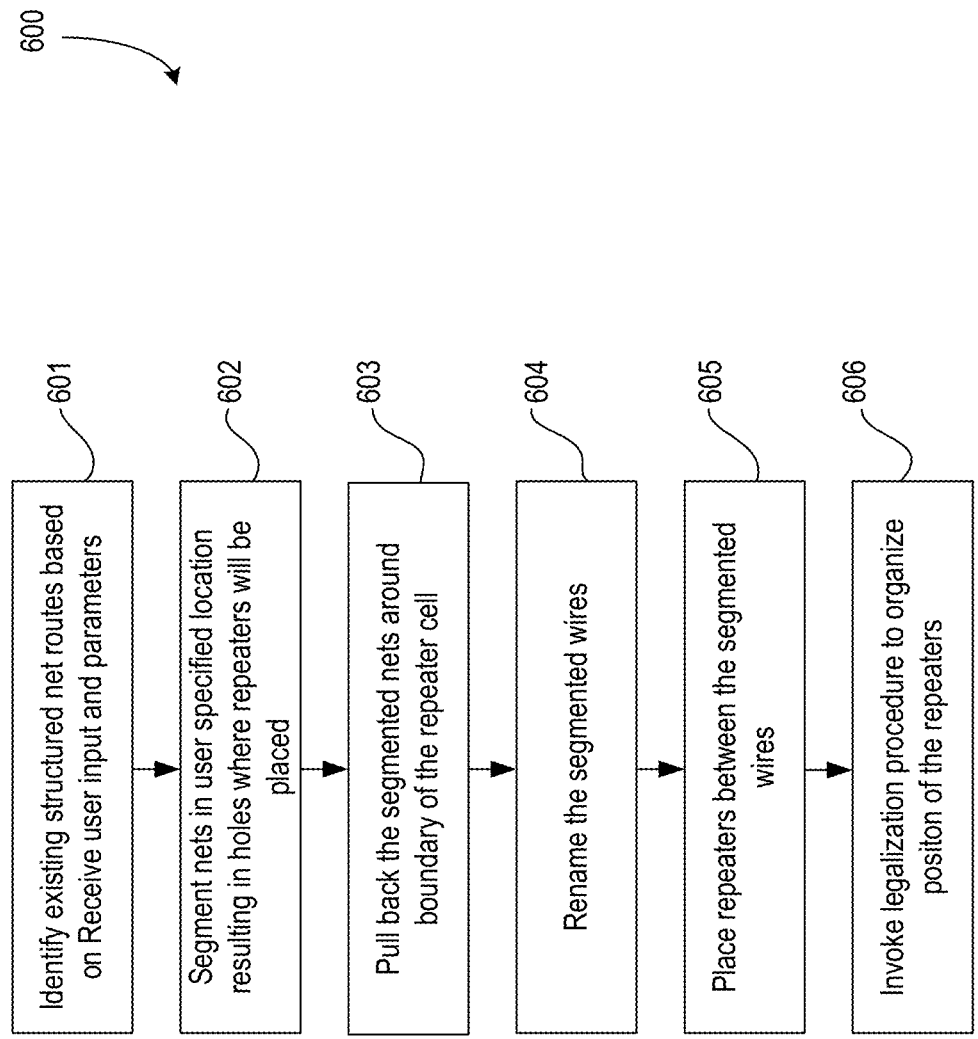
FIG. 6 illustrates a flowchart of a method for placing repeaters on existing structured routing based on geometric consideration, in accordance with some embodiments.

FIG. 6 illustrates flowchart 600 of a method for placing repeaters on existing structured routing based on geometric consideration, in accordance with some embodiments. In some embodiments, at block 601 routes of structured nets are identified based on user inputs. For example, computer automated procedure is used for placing repeaters on existing structured net routes based on user input passed through various options and parameters (user assisted automation). The net routing is selected from the design based on the user input in the form of a list of net names or a collection of nets, busses and bundles.

At block 602, the structured nets are segmented to generate a multiple of segmented structured nets. The wires of routes are cut in user specified locations resulting in multiple segments around the holes where repeaters will be placed. The repeater cell name is passed by the user as a required option.

At block 603, the multiple of segmented structured nets are retracted around a boundary of a target cell. For example, the segmented wires are pulled back around the boundary of the repeater cell.

At block 604, the retracted multiple of segmented structured nets are renamed. For example, after pullback, the nets on segmented wires are renamed to preserve logical connectivity At block 605, target cells are placed in between the multiple of segmented structured nets. At block 606, custom legalization procedure is invoked that changes the target cell placement according to a user arrangement type passed to the command. The arrangement type the user passes is based on certain criteria including one or more of: route-ability from existing routes down to pins of the target cell; elimination of hot spots due to multiple large target cells next to each other; minimization of area occupied by the target cells; available routing resources; or electro migration consideration.

The method further comprises displaying, in a preview mode, placement of repeaters in a layout. The placing the target cells comprises one or more of: placing the target cells in a diagonal fashion; placing target cells in a matrix configuration; placing target cells vertically; placing target cells horizontally; or placing target cells randomly.

Figure 7A:
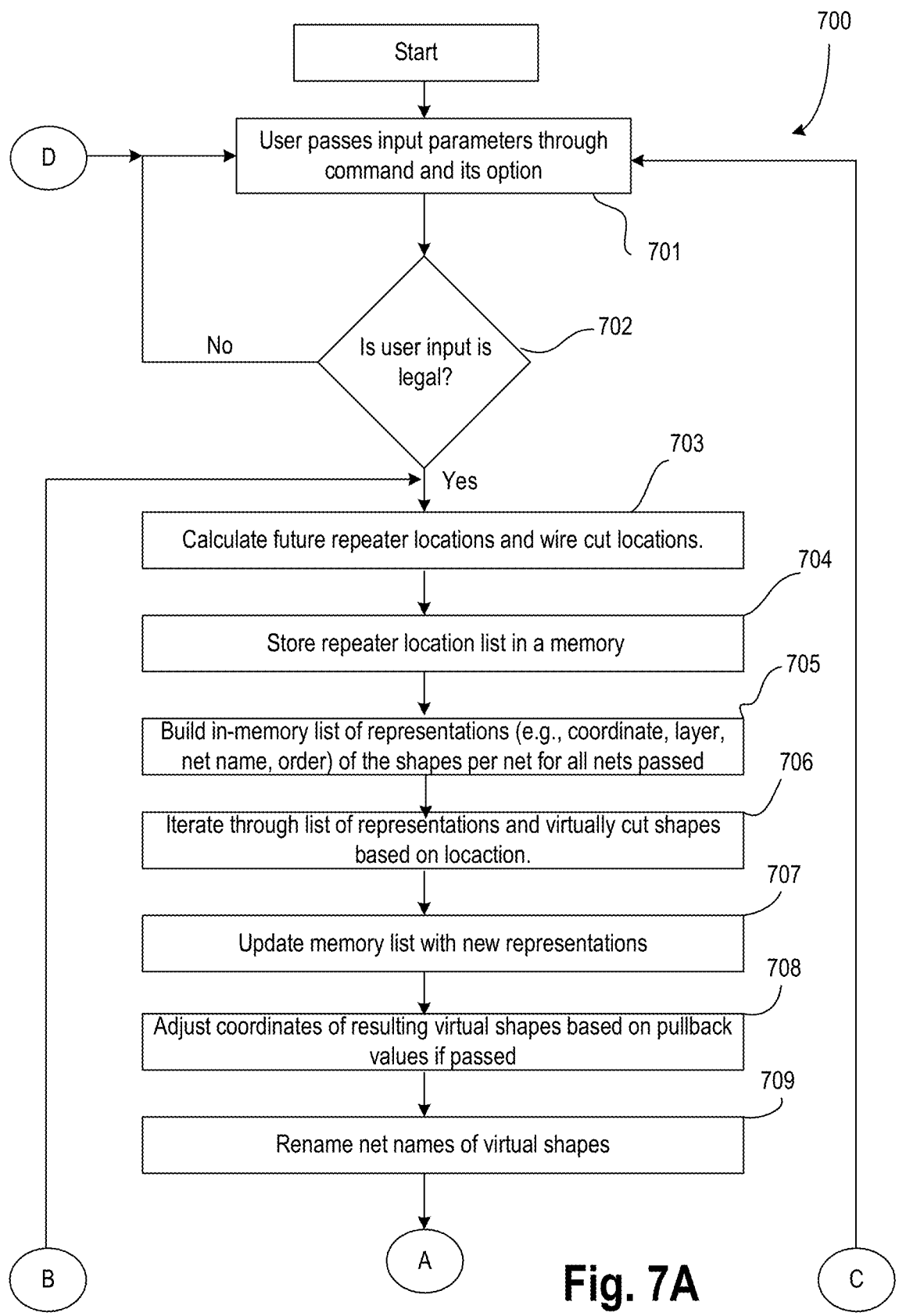
FIGS. 7A-B illustrate a flowchart of a method for placing repeaters on existing structured routing based on geometric consideration, in accordance with some embodiments.
Figure 7B:
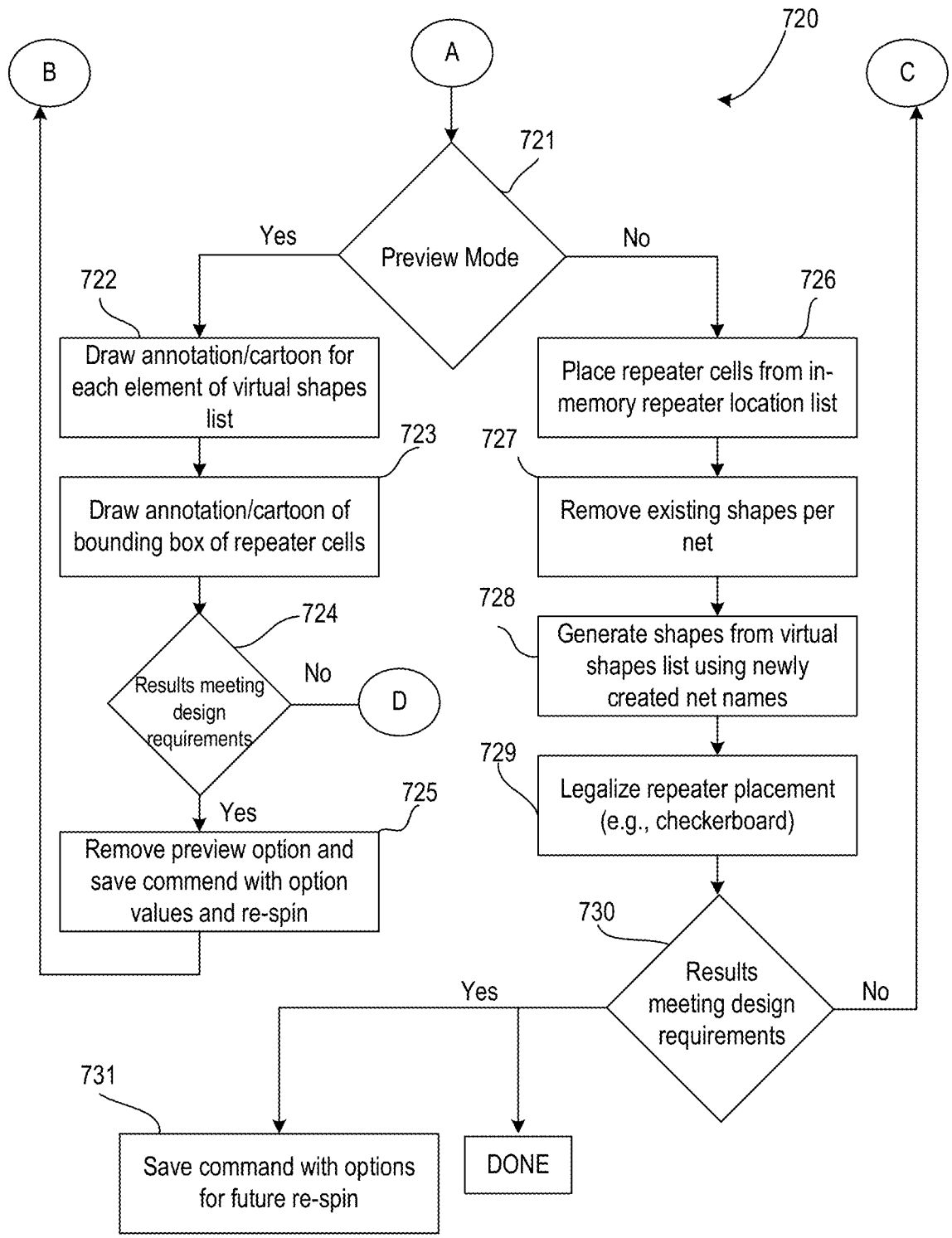

FIGS. 7A-B illustrate flowcharts 700 and 720, respectively, of a method for placing repeaters on existing structured routing based on geometric consideration, in accordance with some embodiments. While the blocks are shown in a particular order, the order can be modified. For example, some blocks can be performed in parallel (or simultaneously) as other blocks.

The process starts with user provided input parameters via commands at indicated by block 701. These commands can be in-line commands with in-line options. As user input parameters are read, they are verified for legality at block 702. At block 702, commands are checked for things such as: does a passed repeater cell exist in the library, do passed nets exist in the design, do values of locations that passed make sense e.g. distance values are positive, cutline coordinates are within the boundary of the design, number of repeaters are positive. If the user input parameters are not legal, then the process requests the user to provide new input parameters as indicated by block 701. Otherwise, the process proceeds to calculating future repeater locations and wire cut locations as indicated by block 703. These locations are stored in memory as a list of locations as indicated by block 704

The process then proceeds to block 705 where in-memory list of representations of the shapes per net for all nets that passed legal muster are built. This list of representations includes coordinates of the layout where repeater cell(s) will be included, metal layers, net name, and order of the segments of the shapes in accordance with the flow from driver to the receiver. These representations are referred to as virtual shapes. At block 706, the process iterates through the list of representations and virtually cut shapes based on location. The list stored in memory is replaced with new representations as indicated by block 707. The coordinates of the resulting virtual shapes is adjusted at block 708 based on net pullback values. The net names of virtual shapes are renamed as indicated by block 709.

The process then follows identifier A and proceeds to block 721 to determine whether preview mode is enabled. If preview mode is enabled, the process proceeds to block 722 where annotations (or cartoon) for each element of the virtual shape list are drawn. Then the bounding box of repeater cells (or target cells) are drawn as indicated by block 723. These bounding boxes are drawn as annotation or cartoons. At block 724, decision is made on whether the outcome of the command satisfies requirements solely by the user based on his/her design needs and expertise. No analysis engines are called by the described procedure making this approach extremely fast. If the results of the command are not satisfactory, then the process proceeds block 701 (following identifier D) to receiving new input parameters from the user. If the results of the drawn elements and bounding boxes meet design requirements, the proceeds to block 725 where the preview option is removed, the command with option values (or series of commands that proceed placement of target cells) are saved, and the process is re-spin. Here, re-pin generally refers to re-using or re-applying the command and options defined by the user to reproduce the same result. The commands and/or series of commands are saved as a recipe (or formula) to be re-executed later to reproduce the place or target cells for a SoC derivative or a scaled process. The process then follows identifier B to calculate further repeater locations and wire cut locations as indicated by block 703.

At block 721 if it is determined that the preview mode is disabled, repeater cells 341 are placed in the calculated locations as indicated by block 726. For example, in-memory repeater locations from the list are realized by placing the repeater cells in those locations. At block 727, existing shapes of the routing per net are then removed from the database as illustrated in FIG. 2 compared to FIG. 1. At block 728, shapes from virtual shape list are generated using newly created net names Original net connectivity and each newly created net are logically reconnected to corresponding repeater cell. At block 729, the repeater placement is legalized according to the repeater arrangement option provided by the user. For example, the repeaters are placed in a checkerboard arrangement. At block 730, a determination is made whether the results meet design requirements by the user. If the design requirements are met, the process is done and the command with options for future re-spin are saved as indicated by block 731. If the design requirements are not met, the process follows identifier C and new user input parameters are requested as indicated by block 701.

While the various embodiments are explained with reference to user generated commands and options, this process can be replaced with automatically generated command and options. For example, artificial intelligence (or machine-learning) can be used to automatically generated command and options. In some embodiments, aspect ratios and other criteria can be used by machine-learning to generate locations for the target cells.

The embodiments of placing target cells may be performed on a complete layout or partial layout. For example, a layout with partial routes can still be used for placing target cells. As such, full physical connectivity of routes may not be necessary for placing target cells using the method of various embodiments.

Figure 8:
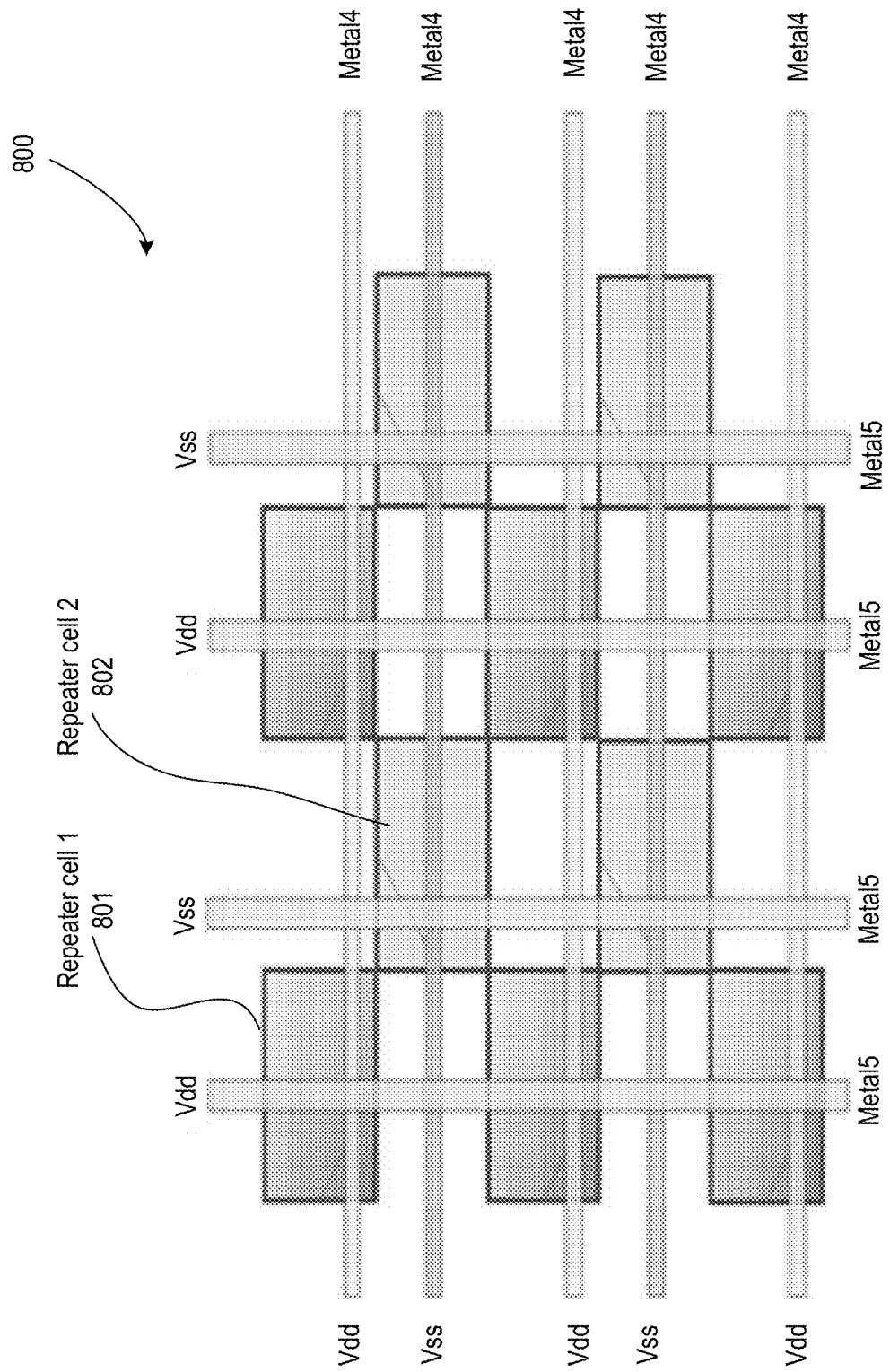
FIG. 8 illustrates structured repeater placement (in checkerboard fashion) in conjunction with power grid to demonstrate regularity of design suitable for pattern recognition, in accordance with some embodiments.

FIG. 8 illustrates layout snapshot 800 of structured repeater placement (in checkerboard fashion) in conjunction with power grid to demonstrate regularity of design suitable for pattern recognition, in accordance with some embodiments. The mechanism of placing ladders takes advantage of regular structure and repetitive nature of the design. The mechanism for placing lattice style multi-layer metal structures over cells leverages the fact that cells are placed in a gridded manner on pre-defined rows/columns known as site_rows. Furthermore, regular patterns of reference lines such as power grid over the cells is also taken into account when placing lattice-style multi-layer metal structures over cells because the reference lines have predefined pitches. In the following embodiments, power/ground supply lines (Vcc and Vss) are used as reference lines.

Knowing that cells are placed in a gridded manner on pre-defined rows and/or columns and that power and/or ground lines have predetermine pitches, allows for efficient placement of lattice-style multi-layer metal structures over cells during early design stages when planning of timing critical nets and floor-planning of major components are done. At this point, merely major circuit blocks are placed, critical structured routing is done, and repeaters (or other heavily used cells) are inserted on those routes. Zero to little obstructions are present at this early design stage as the remaining logic cells are not yet placed, and detailed routing has not been done. FIG. 8 illustrates structured placement of repeater cells 801 and 802 in checkerboard fashion in conjunction with power/ground grid to demonstrate regularity of design suitable for pattern recognition. The embodiments of placing lattice-style multi-layer metal structures over cells is not limited to checkerboard cells. Any pattern of cell placement can be candidates for placing lattice-style multi-layer metal structures over them.

Figure 9:
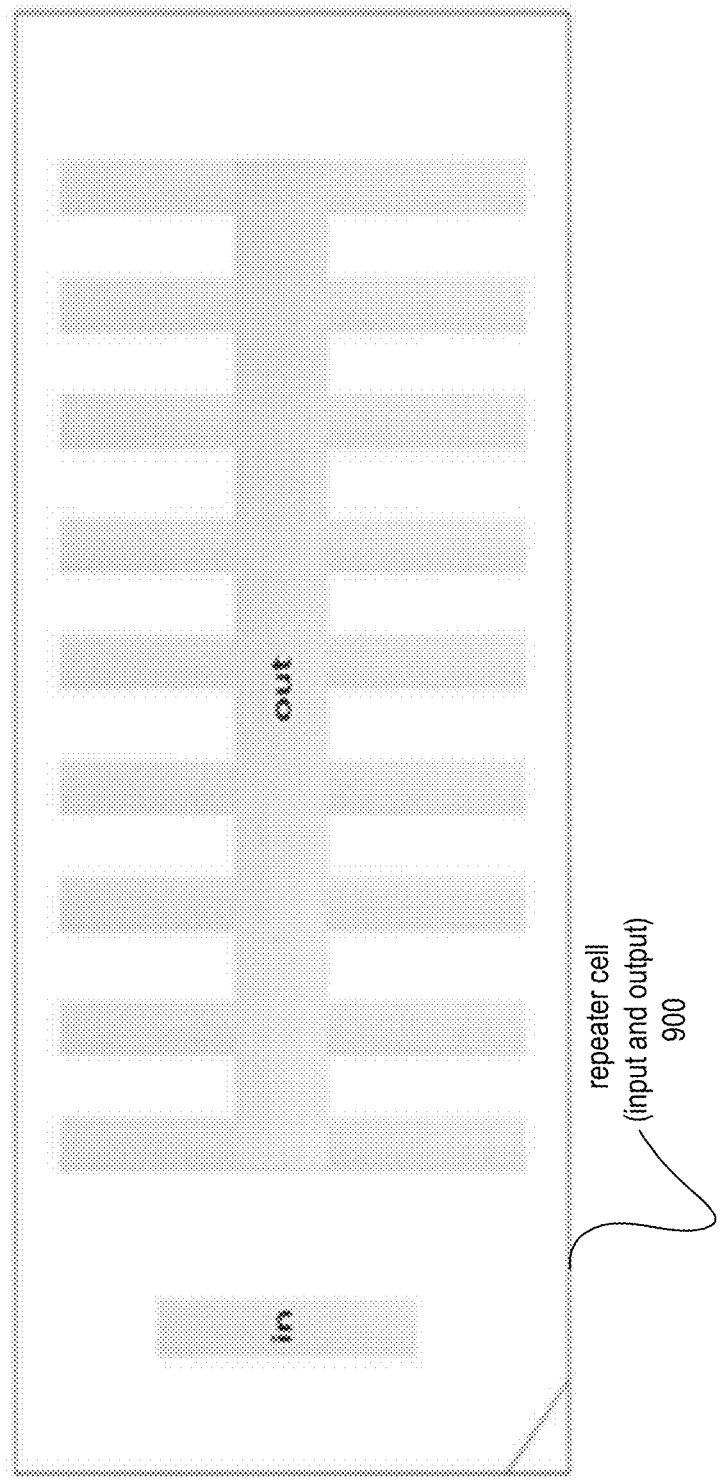
FIG. 9 illustrates a repeater cell (with input and output pins) slated for ladder placement.

FIG. 9 illustrates repeater cell 900 (with input and output pins) slated for ladder placement. The mechanism of various embodiments uses a computer automated procedure for placing ladders on existing repeater cells based on user input passed to an algorithm through various options and parameters (user assisted automation). The user defines target repeater cells to place ladder on cells by passing either a list of cell names, a collection of cells and pin direction (input or output) to the command. User also passes the definition of the ladder in terms of number of straps per layer and width. Optionally, the user can define the ladder in terms of the resistance value of the ladder to be created. In this case, an algorithm is called to convert the resistance value into corresponding definition in terms of number of straps per layer and width.

An example of the command to place the ladder lattice is as follows:

```
command usage: cr_create_ladders Creates via ladders based on user input.
To collect them use -filter iccpp_trunk=~iccpp_ladder_(netName)
        [-cell_instances]    (collection of cells)
        [-pin_type]    (either in or out)
        [-layer_width_straps ] (list of ',' separated layer,width,number_of_
straps, e.g., m2,1x,2 m3,1x,5 m4,1x,2 m5,1.5x-2x,2 m6,2x,2 m7,2x,2)
        [-add_routing_guide] (create routing guides (that act like a blockage)
over each ladder rung minus the top rung of the ladder; to prevent z-route
from connecting to those N-1 via straps/rungs)
        [-use_full_cell_bbox] (instead of using pin bounding box bbox to
drive ladder rungs, use cell bbox entirely)
        [-do_not_add_vias]    (by default vias will be added to each rung,
if this is passed, vias will not be inserted)
        [-allow_straps_outside_bbox] (allows the search/find free tracks
outside of bbox in case of obstruction for via ladder insertion, preventing
straps to be inside bbox.
Allow the straps to be created. Search to go left/right of the straps)
        [-preview] (do not create shapes, just draw annotations of shapes)
```

The outcome of running the command is a lattice like layout structure over each and every repeater cell specified by -cell_instances option.

The ladder structure comprises parallel metal straps of layer and width specified by -layer_width_straps options.

Vias are placed on connecting crossing layers by default. Optionally user can pass -do_not_add_vias to direct command not to create the vias.

By default, straps are created over the area occupied by the bounding box of the pin specified by -pin_type (either input or output) of a repeater cell.

User can modify the area to create a ladder structure over by passing either -user_full_cell_bbox, which sets the area to be equal to the bounding box of a repeater cell; or -allow_straps_outside_bbox to allow the search/find free tracks outside of bounding box in case of obstruction for via ladder insertion, preventing straps to be inside bounding box. This allows the straps to be created and search left/right of the straps.

The straps (metal lines) are placed on pre-defined layer tracks and spread evenly over the area of the cell. If the number of available tracks is less than a number of straps specified by the user, a partial ladder is generated and reported.

To help steer the router to connect to the top rung of the ladder to the structured routing above, the option -add_routing_guide can be passed. The command creates routing guides (that act like a routing blockage) over each ladder rung minus the top rung of the ladder to prevent router from connecting to those N−1 via straps/rungs.

A detailed report of the result is generated to present a summary and statistics of the outcome to the user. An option -preview can be passed to turn on a mode when the command does not create real layout objects in the database but rather creates annotations (cartoon drawings) displayed on the canvas.

Some option includes:
[-extend_bbox_per_layer] (4 values for all layers or 4 values per layer; will help with downgrading of wires)
[-add_metal] (if the default area is overridden to grow, straps of ladder segments might not intersect existing shapes of pins, this option will tell the command to extend pins by adding metal to cross new ladder strap)
[-porosity] (expressed in tracks skipped per power gutter to reserve routing resources for later use).

Figure 10:
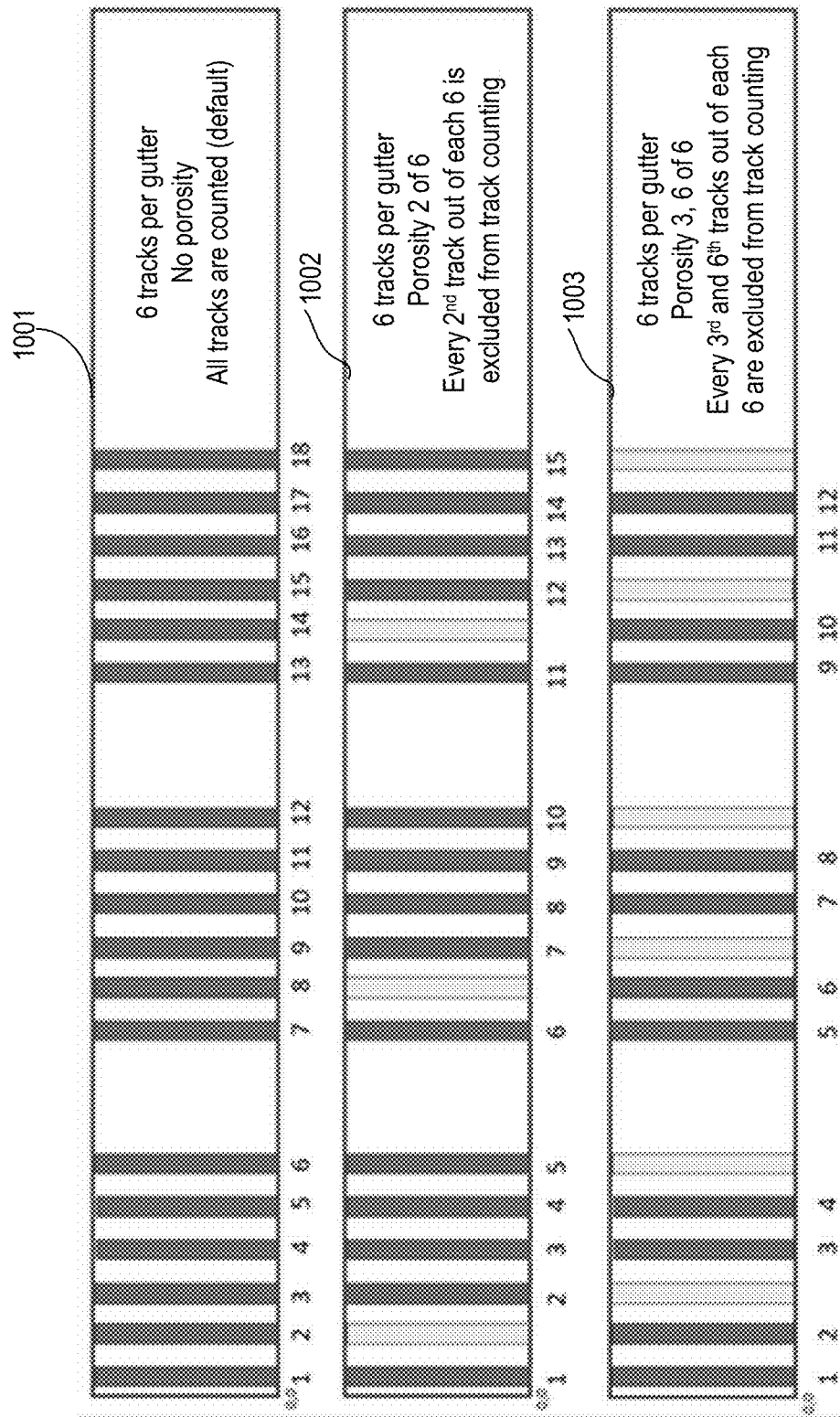
FIG. 10 illustrates porosity example showing tracks excluded from track counting by a mechanism that places lattice style multi-layer metal structures over cells, in accordance with some embodiments.

FIG. 10 illustrate porosity examples 1001, 1002, and 1003 showing tracks excluded from track counting by the mechanism that places lattice style multi-layer metal structures over cells, in accordance with some embodiments. In example 1001, there are 6 tracks per gutter, no porosity, and all tracks are counted. In example 1002, there are 6 tracks per gutter, and porosity of 2 of 6 (e.g., every second track out of each six is excluded from track counting). In example 1003, there are 6 tracks per gutter and porosity 3 and 6 of 6 (e.g., every third and sixth tracks out of each six are excluded from track counting).

Figures 11A, 11B:
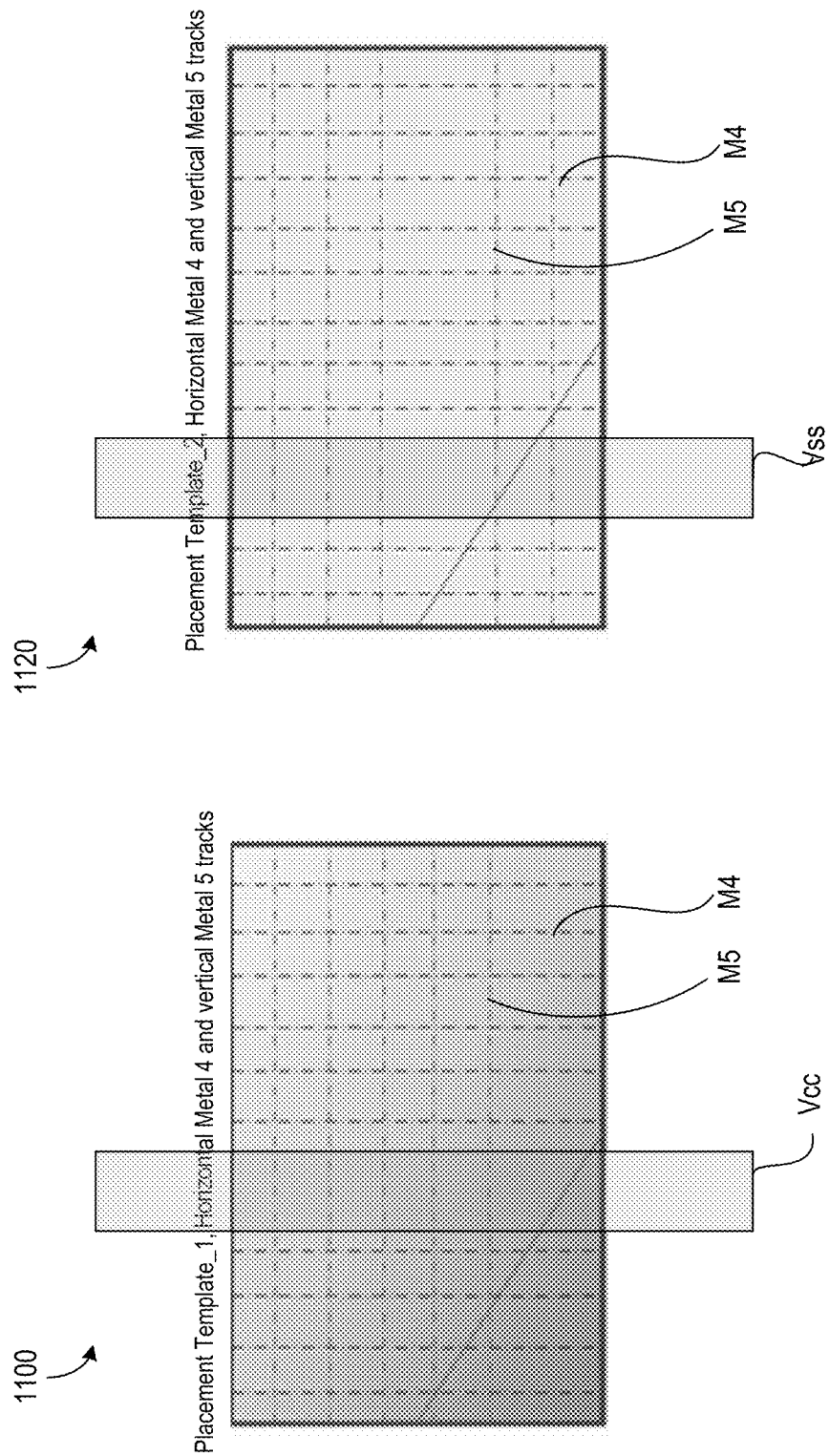
FIGS. 11A-B illustrate extracted placement template for two metal layers (e.g., 2 unique templates for 10 cell instances from FIG. 8), in accordance with some embodiments.

FIGS. 11A-B illustrate extracted placement templates 1100 and 1120, respectively, for two metal layers (e.g., 2 unique templates for 10 cell instances from FIG. 8), in accordance with some embodiments. For each repeater cell, unobstructed tracks are extracted that intersect the cell for each layer and width passed. A set of coordinates of extracted tracks relative to the origin of the cell uniquely defines a repeater cell placement template. As a result, all the repeater cells are bucketed by the unique placement templates. In addition, the transformation of each cell for a given template is stored. To further speed up the process of building template buckets, machine learning algorithms can be used to infer placement templates rather than running algorithms to calculate them each time.

For each placement template, a ladder template is generated using coordinates of the available unobstructed tracks by spreading metal straps evenly over the specified area. In the case when a number un-occupied tracks is less than the required number to generate the user specified ladder, there is an option to generate a partial ladder.

Figures 12A, 12B:
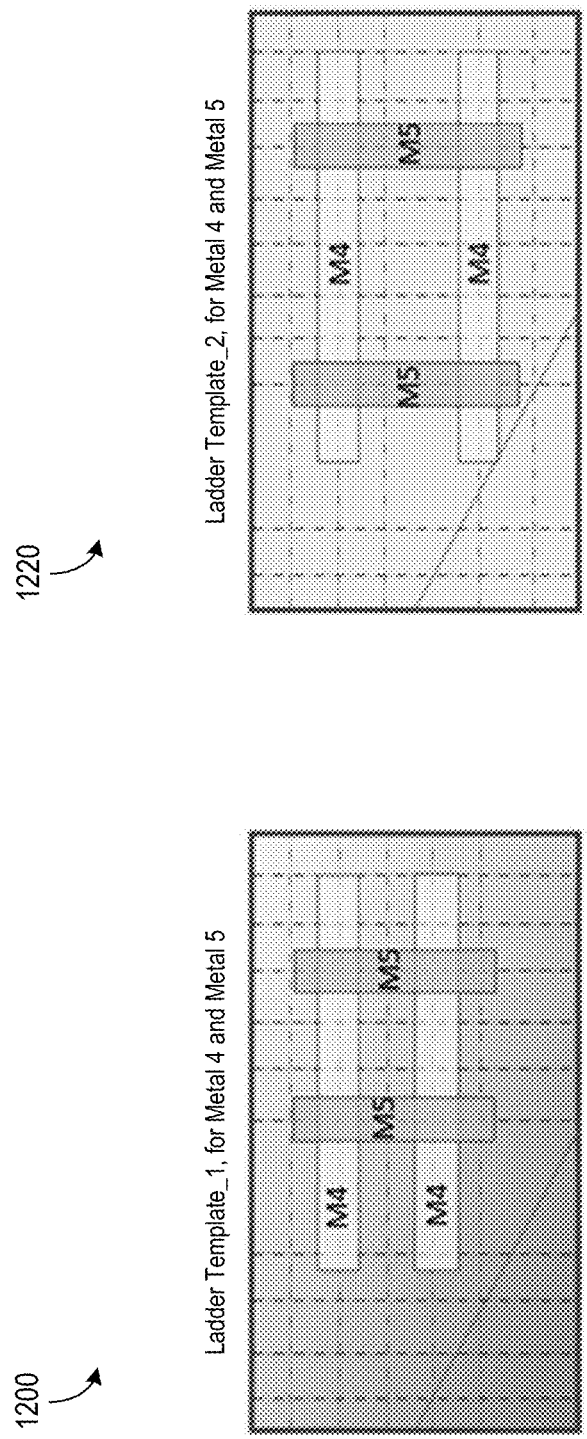
FIGS. 12A-B illustrate depiction of ladder templates for two metal layers for corresponding placement templates from FIGS. 11A-B, in accordance with some embodiments.

FIGS. 12A-B illustrate depiction of ladder templates 1200 and 1220, respectively, for two metal layers for corresponding placement templates from FIGS. 11A-B, in accordance with some embodiments. The ladder template geometry coordinates are relative to the origin of the cell. By default, the area is the bounding box of the repeater cell pin. A user can override the area by passing an option to use the full cell bounding box of the cell or even allow the area to grow outside the cell in terms of number of tracks. At this point, a ladder template comprises intersecting metal layer straps. A user has the option to add vias as part of the ladder template or via insertion can be delayed. In certain use cases, vias may not be needed at all, e.g. preview mode described later. Also, a user has an option to add routing blockages to all metal straps besides the top most. This will steer the router to connect to the ladder will only hit the top most rung.

Figure 13:
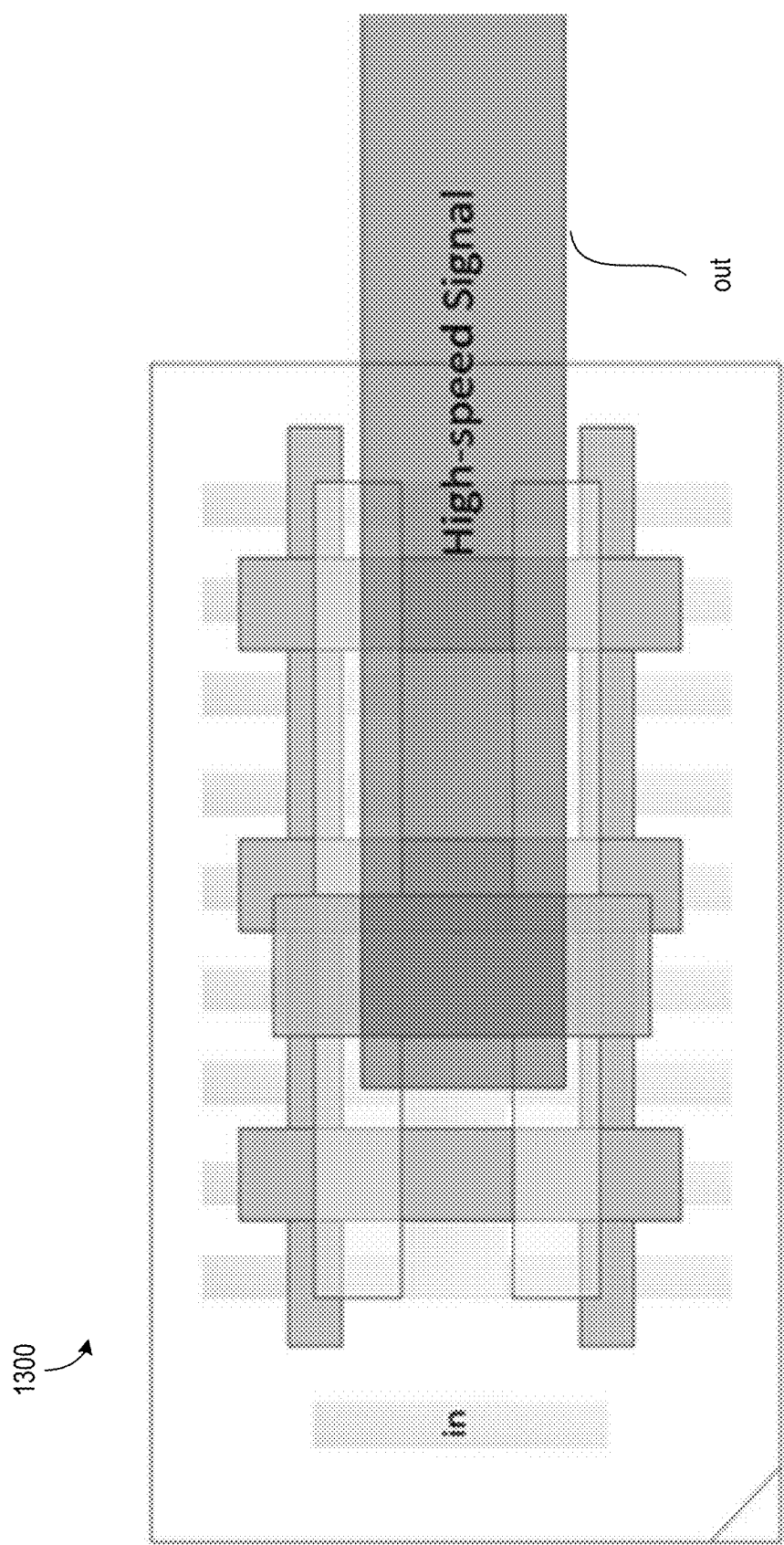
FIG. 13 illustrates an example of ladder structure fully formed and connected to high-speed route from top rung of ladder, in accordance with some embodiments.

FIG. 13 illustrates an example of ladder structure 1300 fully formed and connected to high-speed route from top rung of ladder, in accordance with some embodiments. For each cell in a bucket, a ladder template coordinates (with or without vias) are transformed to each unique instance of a cell using the cells transformation matrix stored in the bucket resulting in a ladder placed over top of the cell. A detailed report is generated (on user demand) at the end of the ladder creation providing the user with a summary and statistics of success, failure and partially created ladders.

Figure 14A:
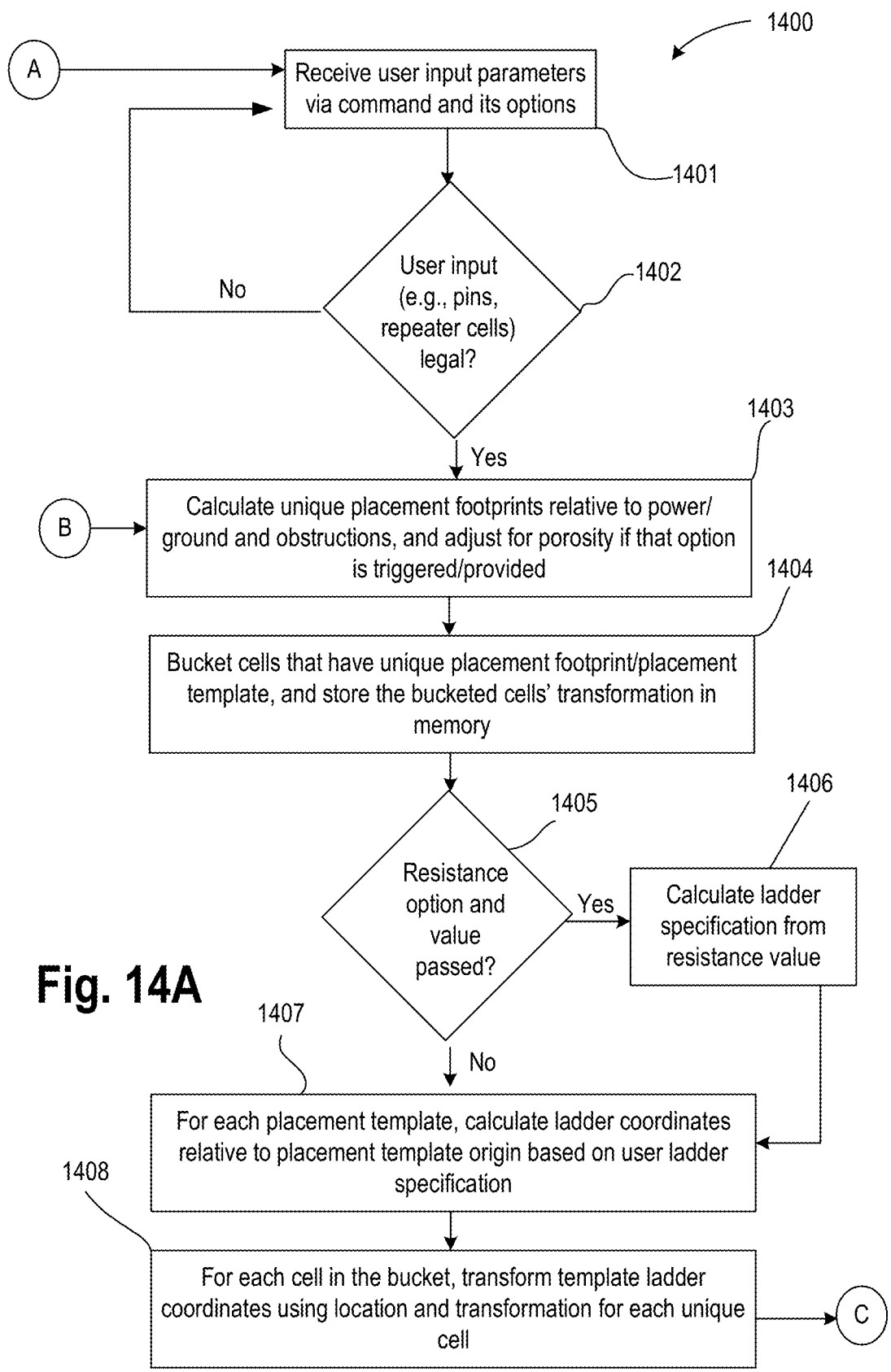
FIGS. 14A-B illustrate flowcharts of a method for placing lattice style multi-layer structures over cells, in accordance with some embodiments.
Figure 14B:
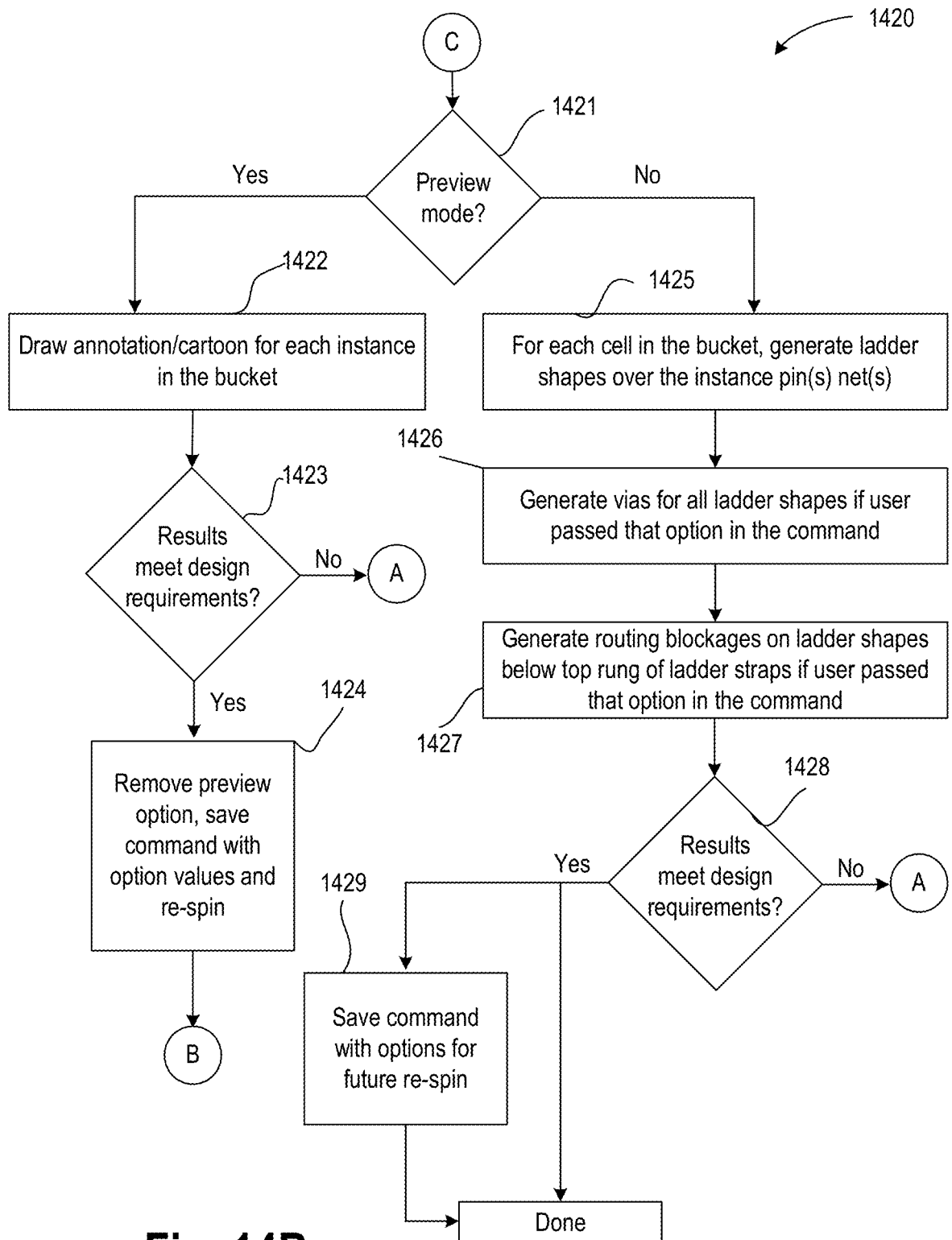

The scheme of various embodiments also provides a preview mode when the command does not create real layout objects in the database but rather creates annotations (cartoon drawings) displayed on the canvas. The previews (annotations) are virtual layout objects, not persistent, and exist merely during the interactive session. Once the session ends, the previews are destroyed. The previews give users the exact depiction of how the layout will be produced without the need of modifying the database. With the preview approach, the user is free to try multiple attempts without spending the time and effort rolling back to the original state. This mode is extremely fast giving the user the ability to perform multiple what-if analysis thus enabling efficient iterations to get to a result quicker. Once the user achieves the desired result, it can be committed to layout by running same command without the preview mode. Additionally, the user can save the command with values of options in a file such that layout can be reproduced anytime later by issuing the command FIGS. 14A-B illustrate flowcharts 1400 and 1420, respectively, of a method for placing lattice style multi-layer structures over cells, in accordance with some embodiments. While the various operation blocks are shown in a particular order, the order can be changed. For example, some operations can be performed before others or in parallel to other operations.

At block 1401, the process begins by receiving user input parameters via a command to place the ladder lattice. The command can have one or more options. The command can be an in-line command in a user X-terminal or a command on a graphical user interface of any suitable tool such as place-and-route tool, layout tool, etc. Upon receiving the command, at block 1402, the command is scrubbed for any improper or faulty options and/or user parameters. An example of a faulty parameter is a case when the user passes a repeater cell to place ladders over and that repeater cell does not exist in the library or the user passes pins/nets that do not exist in the database. If the user inputs are improper, faulty or illegal, then the user is prompted with an error and requested to input the user parameters again at block 1401.

If a user passes ladder specification to the command as a resistance value, for example, a user may desire to have a particular range of values of resistance for the via ladder to achieve a particular timing characteristics (e.g., propagation delay through the cell). If such resistance value is passed in the command, the ladder specification is determined or calculated to achieve that particular or substantially same resistance value. For example, number of vias may increase or decrease, number of metal routings or straps may increase or decrease to achieve the resistance value, or substantially that resistance value. As a result, the ladder will be specified as number of straps per layer.

If the user inputs are legal, then the process proceeds block 1403 where unique placement of repeater cell footprints are calculated relative to reference signal lines (e.g., power and/or ground) and other obstructions. Examples of obstructions are any objects that are in the same layer as passed by the ladder specification and intersect the area in which ladder straps will be, including, but not limited to shapes, routing blockages, terminals, keep out regions, etc. A unique placement of a repeater cell footprint is characterized by coordinates of un-obstructed signal tracks per layer and width, measured relative to the repeater cell origin. In some embodiments, if the command option for porosity is invoked by the user, then enumeration of available tracks is adjusted to reflect the porosity values the user passed. Porosity, specified per layer, is pruning of or excluding of certain tracks out of a repeated set of tracks. For example, exclude every second and eighth track out of each set of 20. The user would do this to ensure they leave open tracks for future routing in every second and eighth track of the repeat period, for example.

After calculating the unique placement of footprints, the cells are bucketed or grouped as indicated by block 1404. For example, cells that have unique placement footprint or placement template, those cells (e.g., repeaters) are stored in memory among a group of similar unique cells. Once all cells of interest are grouped, at block 1405, the user command is checked for any invocation of resistance value associated with the via ladder. For example, a user may desire to have a particular range of values of resistance for the via ladder to achieve a particular timing characteristics (e.g., propagation delay through the cell). If such resistance value is passed in the command, the ladder specification is determined or calculated to achieve that particular or substantially same resistance value as indicated by block 1406. For example, number of vias may increase or decrease, number of metal routings or straps may increase or decrease to achieve the resistance value, or substantially that resistance value.

The process then proceeds block 1407 to calculate ladder coordinates for each placement template. For example, for each placement template associated with the bucket or group of cells, ladder coordinates relative to placement template is calculated based on user ladder specification (or user input) resulting in one master ladder. Each and every cell in the bucket, share the same master ladder. For example, relative coordinates of ladder shapes are the same for each cell in the same bucket. At this point, the ladder coordinates are recalculated to the top level coordinate system by using transformation and location values for each unique cell in the bucket as indicated by block 1408.

At block 1421 a determination is made about preview mode. If the user invokes the preview mode in the command, then for each cell in the bucket, an annotation or carton is drawn up to provide a visual depiction of the ladder lattice as indicated by block 1422. At block 1423, the visual ladder lattice can then be reviewed to see if it meets the design requirements such as a resistance value, propagation delay, area, etc. If the design requirements are not met, the process proceeds to the start 1401 where user input parameters are adjusted and the command is executed again. The preview mode option allows for what-if scenarios without impacting the actual database of the layout. If the user design requirements are met then at block 1424 the preview mode is disabled or removed, and command for ladder lattice placement along with its operation are saved in memory for future use or re-spin. The process then proceeds to calculating unique placement footprints relative to power/ground and obstructions, and adjust for porosity if that option is triggered/provided. The lattice ladder can then be actually placed over/on the cells.

If the user did not invoke the preview mode in the command, then the process proceeds to block 1425 where preview mode is skipped and for each cell in the bucket, ladder shapes are generated for the bounding box over the instance pin(s) such as input/or output pins of a repeater. Once the shapes of the ladder are generated (e.g., the metal straps are placed), then at block 1426 vias are generated to connect the metal straps. In some embodiments, vias for the ladder lattice are generated if the command indicate that the metal straps should be shorted. The command and/or options are later saved if design requirements for the ladder lattice are met.

During early feasibility studies when multiple iterations of ladder insertion might need to happen, vias may not be used to analyze the quality and congestion of the multiple ladder straps. Via generation adds extra time that might not be warranted for a feasibility study. When the user is satisfied with ladder strap coverage (e.g., 100% ladder lattice target is achieved), they may add an option to create vias to proceed further in quality evaluation of the feasibility study. After connecting the metal straps by vias and connecting the metal straps to the pin(s) of interest, routing blockages on ladder shapes might be generated per user request as indicated by block 1427.

The blockages are a special object of the same layer of the straps that duplicates directly on top of each strap to inform the detailed routing tool not to connect to any shape below the top rung of the ladder. At block 1428 mechanism then checks if the placement of ladder lattice meets the design requirements (e.g., resistance value, propagation delay, area). If the design requirements are not met, the process proceeds to the start where user input parameters are adjusted and the command is executed again. If the user design requirements are met, then at block 1429 the command for ladder lattice placement along with its operation are saved in memory for future use or re-spin. Otherwise, the process proceeds to block 1401.

Figure 15:
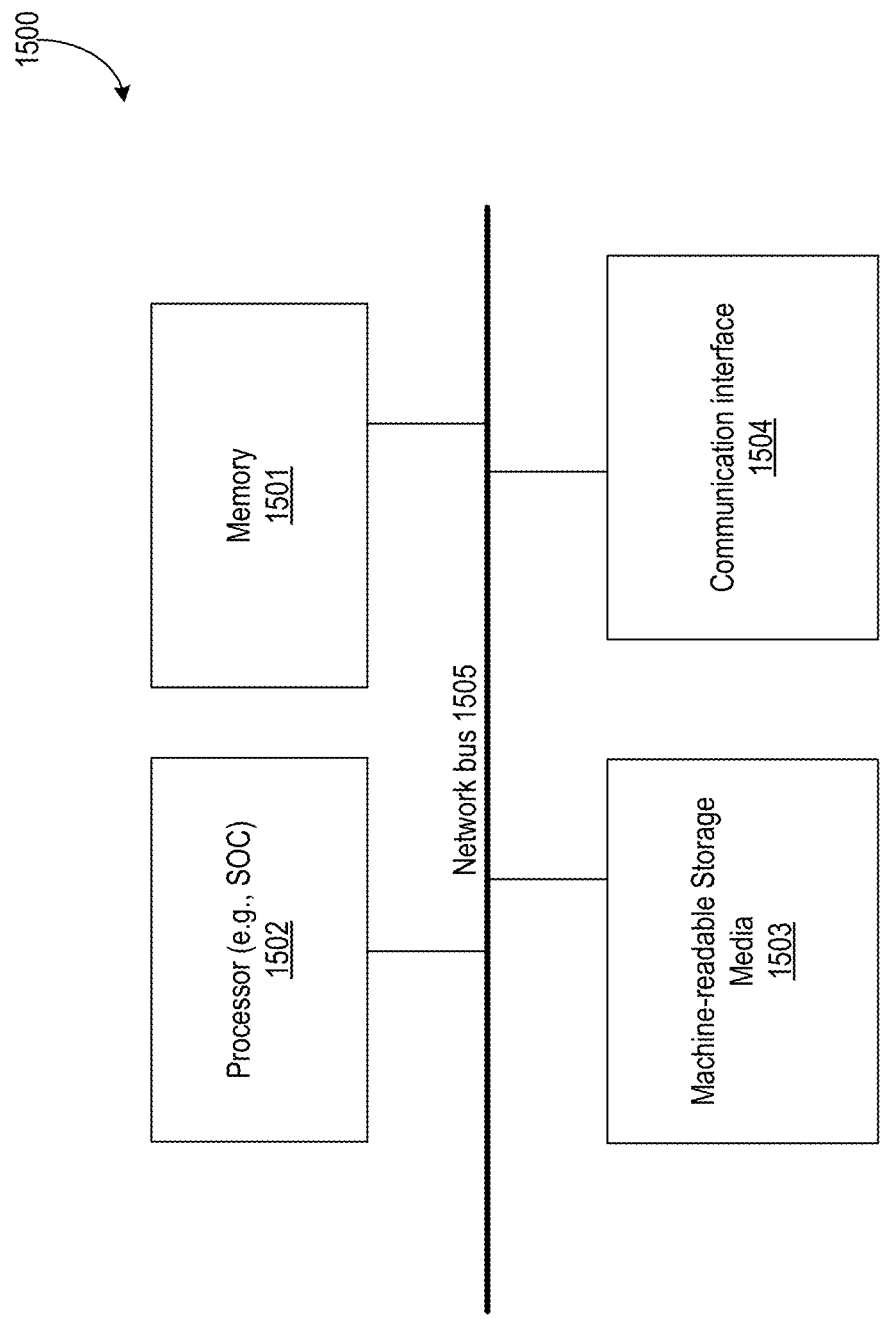
FIG. 15 illustrates a simplified computer system for executing the flowchart, in accordance with some embodiments.

FIG. 15 illustrates a simplified computer system 1500 for executing the flowcharts, in accordance with some embodiments. Elements of embodiments are also provided as a machine-readable medium (e.g., memory) for storing the computer-executable instructions (e.g., instructions to implement any other processes discussed herein) also referred to as machine-executable instructions. In some embodiments, the computing platform comprises memory 1501, processor 1502, machine-readable storage media 1503 (also referred to as tangible machine readable medium), communication interface 1504 (e.g., wireless or wired interface), and network bus 1505 coupled together as shown.

In some embodiments, processor 1502 is a Digital Signal Processor (DSP), an Application Specific Integrated Circuit (ASIC), a general purpose Central Processing Unit (CPU), or a low power logic implementing a simple finite state machine to perform the method of various embodiments, etc.

In some embodiments, the various logic blocks of the system are coupled together via network bus 1505. Any suitable protocol may be used to implement network bus 1505. In some embodiments, machine-readable storage medium 1503 includes Instructions (also referred to as the program software code/instructions) for calculating or measuring distance and relative orientation of a device with reference to another device as described with reference to various embodiments and flowchart.

Program software code/instructions associated with the methods and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with various embodiments are executed by the computing system.

In some embodiments, the program software code/instructions associated with various flowcharts are stored in a computer executable storage medium and executed by processor 1502. Here, computer executable storage medium 1503 is a tangible machine readable medium that can be used to store program software code/instructions and data that, when executed by a computing device, causes one or more processors (e.g., processor 1502) to perform a method(s) as may be recited in one or more accompanying claims directed to the disclosed subject matter.

Tangible machine-readable medium 1503 may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media 1503 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium 1503 includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 16:
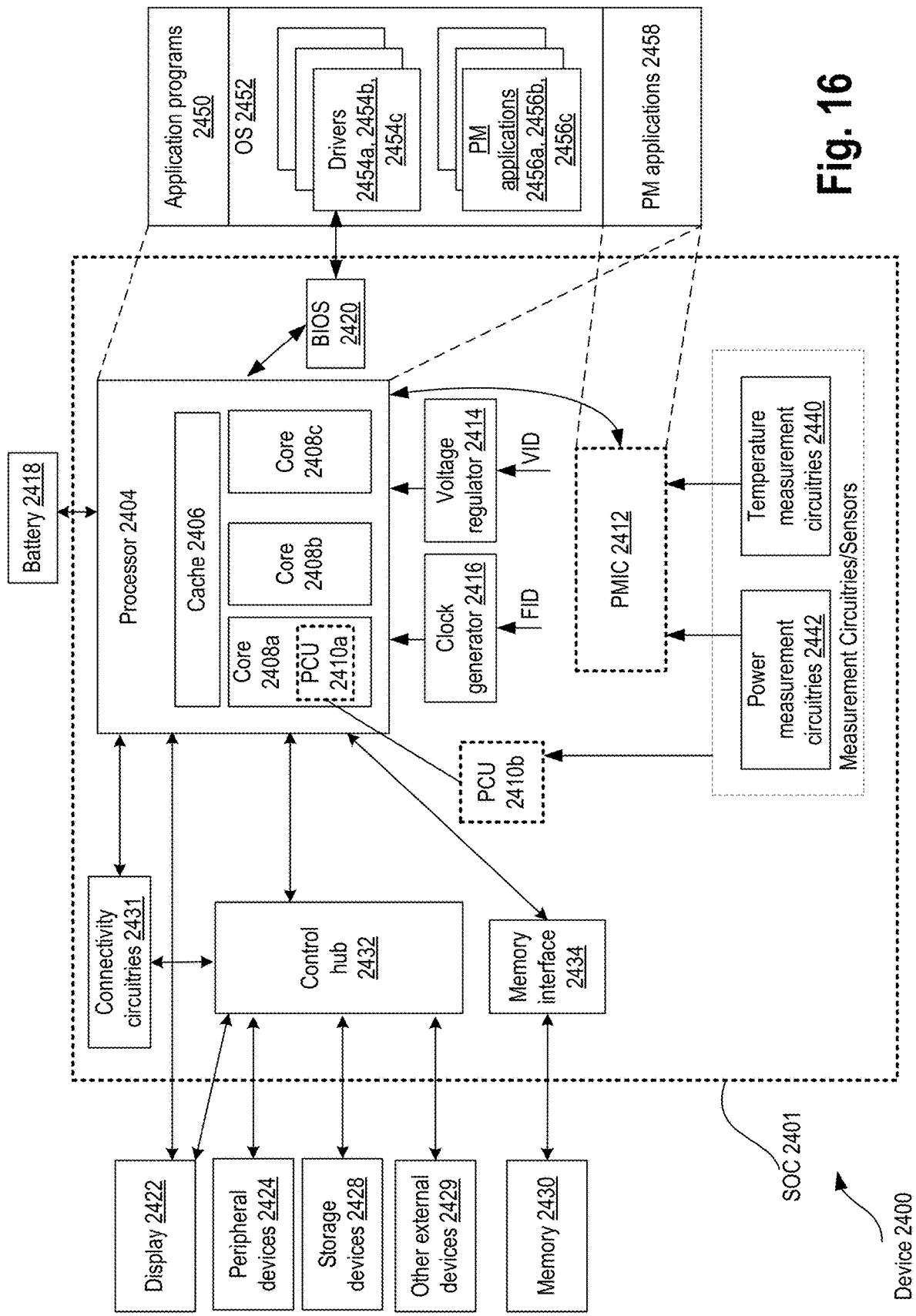
FIG. 16 illustrates a smart device or a computer system or a SoC (System-on-Chip) with repeaters placed using the placement mechanism and/or with lattice style multi-layer metal structures over cells, in accordance with some embodiments.

FIG. 16 illustrates a smart device or a computer system or a SoC (System-on-Chip) with repeaters placed using the placement mechanism and/or with lattice style multi-layer metal structures over cells, in accordance with some embodiments.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises a SoC (System-on-Chip) 2401. An example boundary of the SOC 2401 is illustrated using dotted lines in FIG. 16, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Processor 2404 may be a heterogeneous processor with small and large processor cores. In some embodiments, processor 2404 includes apparatus for dynamic selection of an optimal processor core for power-up and/or sleep modes Although merely three cores 2408*a*, 2408*b*, 2408*c* are illustrated in FIG. 16, processor 2404 may include any other appropriate number of processing cores, e.g., tens, or even hundreds of processing cores. Processor cores 2408*a*, 2408*b*, 2408*c* may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408*a*, a second section of cache 2406 dedicated to core 2408*b*, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device

2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random access memory (DRAM) device, a static random access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a mother-board of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410*a/b* and/or PMIC 2412. In some embodiments, each core has a network of distributed LDOs to provide efficient control for power management. The LDOs can be digital, analog, or a combination of digital or analog LDOs.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter. In various embodiments, the battery includes a pressure chamber as discussed with reference to various figures to provide uniform pressure.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410*a*. In an example, some other sections of PCU 2410 may be implemented outside the processing cores 2408, and these sections of PCU 2410 are symbolically illustrated using a dotted box and labelled as PCU 2410*b*. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456a, 2456b, 2456c. The OS 2452 may also include various drivers 2454a, 2454b, 2454c, etc., some of which may be specific for power management purposes. In some embodiments, device 2400 may further comprise a Basic Input/Output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments described herein are illustrated as examples. The features of these examples can be combined with one another in any suitable way. These examples include:

Example 1: A machine-readable storage media having machine-readable instructions that, when executed, cause one or more machines to perform a method comprising: identifying routes of structured nets based on user inputs; segmenting the structured nets to generate a multiple of segmented structured nets; retracting the multiple of segmented structured nets around a boundary of a target cell; renaming the retracted multiple of segmented structured nets; and placing or legalizing target cells in between the multiple of segmented structured nets.

Example 2: The machine-readable storage media of example 1, wherein the user inputs include: a list of net names, a list of collection of nets, busses, and bundles.

Example 3: The machine-readable storage media of claim 1, wherein the target cells include repeaters.

Example 4: The machine-readable storage media of example 1, wherein the target cells are legalized according to a user provided criteria including one or more of: routeability from existing routes down to pins of the target cell; elimination of hot spots due to multiple large target cells next to each other; minimization of area occupied by the target cells; available routing resources; or electro migration consideration.

Example 5: The machine-readable storage media of example 1, wherein placing the target cells comprises one or more of: placing the target cells in a diagonal fashion; placing target cells in a matrix configuration; placing target cells vertically; placing target cells horizontally; or placing target cells randomly.

Example 6: The machine-readable storage media of example 1 having machine-readable instructions that, when executed, cause the one or more machines to perform the method comprising: displaying, in a preview mode, placement of repeaters in a layout.

Example 7: The machine-readable storage media of example 4 having machine-readable instructions that, when executed, cause the one or more machines to perform the method comprising: saving in memory a command or series of commands that produced placement of target cells in accordance with the user provided criteria, wherein the command or series of commands are saved into a recipe file to be re-executed later to reproduce the placement of target cells for a SoC derivative or a scaled process.

Example 8: A machine-readable storage media having machine-readable instructions that, when executed, cause one or more machines to perform a method comprising: receive user input parameters and/or options for a ladder lattice via a command; calculate unique placement of metal straps, in a bounding box of a cell, relative to reference lines and/or obstructions; group cells with same unique placement of metal straps; store the grouped cells in memory; determine a configuration of the ladder lattice to achieve a particular resistance of the ladder lattice associated with a pin of the cell; for each placement template of the metal straps, calculate coordinates of the metal straps relative to coordinates of the reference lines and/or obstructions; and place the metal straps forming the ladder lattice for the cell.

Example 9: The machine-readable storage media of example 8, wherein the reference lines include power and ground supply lines.

Example 10: The machine-readable storage media of example 8, wherein the cell is one of: a repeater, inverter, flip-flop, or an intellectual property block.

Example 11: The machine-readable storage media of example 8 having machine-readable instructions that, when executed, cause the one or more machines to perform the method comprising: identify whether a preview mode is invoked on the command; draw annotation of the ladder lattice over the cell if the preview mode is invoked; provide new user input parameters and/or options for the ladder lattice via another command if it is determined that the drawn annotation does not meet design requirements for the ladder lattice; and save the command and/or options if the drawn annotation meets the design requirements for the ladder lattice.

Example 12: The machine-readable storage media of example 8 having machine-readable instructions that, when executed, cause the one or more machines to perform the method comprising: generate vias for the ladder lattice if the command indicate that the metal straps should be shorted; and save the command and/or options if design requirements for the ladder lattice are met.

Example 13: A method comprising: identifying routes of structured nets based on user inputs; segmenting the structured nets to generate a multiple of segmented structured nets; retracting the multiple of segmented structured nets around a boundary of a target cell; renaming the retracted multiple of segmented structured nets; and placing or legalizing target cells in between the multiple of segmented structured nets.

Example 14: The method of example 13, wherein the user inputs include: a list of net names, a list of collection of nets, busses, and bundles.

Example 15: The method of example 13, wherein the target cells include repeaters.

Example 16: The method of example 13, wherein the target cells are legalized according to a user provided criteria including one or more of: route-ability from existing routes down to pins of the target cell; elimination of hot spots due to multiple large target cells next to each other; minimization of area occupied by the target cells; available routing resources; or electro migration consideration.

Example 17: The method of example 13, wherein placing the target cells comprises one or more of: placing the target cells in a diagonal fashion; placing target cells in a matrix configuration; placing target cells vertically; placing target cells horizontally; or placing target cells randomly.

Example 18: The method of example 13 comprising: displaying, in a preview mode, placement of repeaters in a layout.

Example 19: The method of example 16 comprising: saving in memory a command or series of commands that produced placement of target cells in accordance with the user provided criteria, wherein the command or series of commands are saved into a recipe file to be re-executed later to reproduce the placement of target cells for a SoC derivative or a scaled process.

Example 20: A system comprising: a memory to store instructions; and a processor coupled to the memory; and a wireless interface to allow the processor to communicate with another device, wherein the processor to execute the instructions in the memory, wherein the processor is to: identify routes of structured nets based on user inputs; segment the structured nets to generate a multiple of segmented structured nets; retract the multiple of segmented structured nets around a boundary of a target cell; rename the retracted multiple of segmented structured nets; and place or legalize target cells in between the multiple of segmented structured nets.

Example 21: The system of example 20, wherein the user inputs include: a list of net names, a list of collection of nets, busses, and bundles.

Example 22: The system of example 20, wherein the target cells include repeaters.

Example 23: The system of example 20, wherein the target cells are legalized according to a user provided criteria including one or more of: route-ability from existing routes down to pins of the target cell; elimination of hot spots due to multiple large target cells next to each other; minimization of area occupied by the target cells; available routing resources; or electro migration consideration.

Example 24: The system of example 20, wherein to place the target cells comprises the processor to: place the target cells in a diagonal fashion; place target cells in a matrix configuration; place target cells vertically; place target cells horizontally; or place target cells randomly.

Example 25: The system of example 20, wherein the processor is to display, in a preview mode, placement of repeaters in a layout.

Example 26: The system of example 23, wherein the processor is to save in memory a command or series of commands that produced placement of target cells in accordance with the user provided criteria, wherein the command or series of commands are saved into a recipe file to be re-executed later to reproduce the placement of target cells for a SoC derivative or a scaled process.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having machine-readable instructions that, when executed, cause one or more machines to:
   identify structured net routes based on user inputs;
   segment each structured net route at user-specified locations to generate corresponding segmented structured nets, and
   for each structured net route:
      pull back the corresponding segmented structured nets around a boundary of a target cell;
      place the target cell in between the pulled back corresponding segmented structured nets; and
      legalize the placed target cell, wherein the legalizing changes a position of the placed target cell.

2. The non-transitory machine-readable storage media of claim 1, wherein the user inputs include: a list of net names, a list of collection of nets, busses, and bundles.

3. The non-transitory machine-readable storage media of claim 1, wherein the target cells include repeaters.

4. The non-transitory machine-readable storage media of claim 1, wherein the target cells are legalized according to user-provided criteria including one or more of:
   route-ability from existing routes down to pins of the target cell;

elimination of hot spots due to multiple large target cells next to each other;
minimization of area occupied by the target cells;
available routing resources; or
electro-migration consideration.

5. The non-transitory machine-readable storage media of claim 1, wherein the placing of the target cells comprises one or more of:
placing the target cells in a diagonal fashion;
placing target cells in a matrix configuration;
placing target cells vertically;
placing target cells horizontally; or
placing target cells randomly.

6. The non-transitory machine-readable storage media of claim 1, wherein the machine-readable instructions, when executed, cause the one or more machines to:
display, in a preview mode, placement of the target cells in a layout.

7. The non-transitory machine-readable storage media of claim 4, wherein the machine-readable instructions, when executed, cause the one or more machines to:
save in memory a command or series of commands that produced placement of the target cells in accordance with the user-provided criteria, wherein the command or series of commands are saved into a recipe file to be re-executed later to reproduce the placement of target cells for a System-on-Chip (SoC) derivative or a scaled process.

8. The non-transitory machine-readable storage media of claim 1, wherein the legalizing changes the positions of the placed target cells to ensure that the target cells do not abut one another.

9. The non-transitory machine-readable storage media of claim 1, wherein the legalizing staggers the positions of the placed target cells according to a user-specified cell width.

10. The non-transitory machine-readable storage media of claim 9, wherein the legalizing staggers the positions of the placed target cells according to a user-specified cell height.

11. The non-transitory machine-readable storage media of claim 1, wherein for at least one of the structured net routes, a size of the pull back of the corresponding segmented structured nets around the boundary of the target cell comprises a size of the target cell plus half a width of the target cell.

12. The non-transitory machine-readable storage media of claim 1, wherein for at least one of the structured net routes, a size of the pull back of the corresponding segmented structured net around the boundary of the target cell comprises a size of the target cell plus extra room for tail down routing to pins of the target cell.

13. A method, comprising:
identifying a structured net route based on a user input;
segmenting the structured net route at a user-specified location to generate segmented structured nets; and
pulling back the segmented structured nets around a boundary of a target cell, wherein a size of the pull back comprises a size of the target cell plus extra room for tail down routing to pins of the target cell; and placing the target cell in between the pulled back segmented structured nets.

14. The method of claim 13, wherein the user input includes at least one of: a list of net names, a list of collection of nets, busses, or bundles.

15. The method of claim 13, wherein the target cell comprises a repeater.

16. The method of claim 13, further comprising legalizing the target cell, wherein the legalizing comprises changing a position of the target cell relative to the user-specified location.

17. The method of claim 13, wherein the placing of the target cell comprises:
placing the target cell randomly within an area.

18. The method of claim 13, further comprising displaying, in a preview mode, placement of the target cell in a layout.

19. The method of claim 13, further comprising:
saving in memory a command or series of commands that produced placement of target cells in accordance with user-provided criteria, wherein the command or series of commands are saved into a recipe file to be re-executed later to reproduce the placement of target cells for a System-on-Chip (SoC) derivative or a scaled process.

20. The method of claim 13, wherein a size of the pull back of the segmented structured net around the boundary of the target cell comprises a size of the target cell plus half a width of the target cell.

21. A system, comprising:
a memory to store instructions; and
a processor coupled to the memory, wherein the processor is to execute the instructions to:
identify routes of structured nets based on user inputs;
segment the structured nets to generate a multiple of segmented structured nets;
retract the multiple of segmented structured nets around boundaries of target cells;
rename the retracted multiple of segmented structured nets;
place the target cells in between the multiple of segmented structured nets, to provide placed target cells; and
legalize positions of the placed target cells, wherein the legalizing changes the positions of the placed target cells.

22. The system of claim 21, wherein the user inputs include: a list of net names, a list of collection of nets, busses, and bundles.

23. The system of claim 21, wherein the target cells include repeaters.

24. The system of claim 21, wherein the placed target cells are legalized according to user-provided criteria including one or more of:
route-ability from existing routes down to pins of the target cell;
elimination of hot spots due to multiple large target cells next to each other;
minimization of area occupied by the target cells;
available routing resources; or
electro-migration consideration.

25. The system of claim 21, wherein to place the target cells, the processor is to execute the instructions to spread the target cells by user-specified widths and heights.

26. The system of claim 24, wherein the processor is to save in memory a command or series of commands that produced placement of target cells in accordance with the user-provided criteria, wherein the command or series of commands are saved into a recipe file to be re-executed later to reproduce the placement of target cells for a System-on-Chip (SoC) derivative or a scaled process.

* * * * *